United States Patent
Centers

(10) Patent No.: US 6,529,590 B1
(45) Date of Patent: Mar. 4, 2003

(54) SYSTEMS AND METHODS FOR REMOTELY CONTROLLING A MACHINE

(75) Inventor: Steven D. Centers, Daphne, AL (US)

(73) Assignee: Coltec Industries, Inc., Charlotte, NC (US)

( * ) Notice: Subject to any disclaimer, the term of this patent is extended or adjusted under 35 U.S.C. 154(b) by 0 days.

(21) Appl. No.: 09/163,704

(22) Filed: Sep. 30, 1998

Related U.S. Application Data

(60) Continuation-in-part of application No. 08/946,635, filed on Oct. 8, 1997, now Pat. No. 6,077,051, which is a division of application No. 08/346,251, filed on Nov. 23, 1994, now Pat. No. 5,713,724.
(60) Provisional application No. 60/060,650, filed on Oct. 1, 1997.

(51) Int. Cl.[7] ............................................. H04M 11/00
(52) U.S. Cl. ........................... 379/106.01; 379/102.01; 340/679
(58) Field of Search ...................... 379/106.01, 102.01, 379/102.05, 93.02; 340/679, 680; 417/2, 3, 4–8, 12, 45, 51, 279, 286

(56) References Cited

U.S. PATENT DOCUMENTS

| | | |
|---|---|---|
| 4,227,862 A | 10/1980 | Andrew et al. |
| 4,335,582 A | 6/1982 | Shaw et al. |
| 4,336,001 A | 6/1982 | Andrew et al. |
| 4,385,384 A | 5/1983 | Rosbury et al. ............... 371/22 |
| 4,435,139 A | 3/1984 | Astberg |
| 4,453,900 A | 6/1984 | Schibbye et al. |
| 4,502,842 A | 3/1985 | Currier et al. |
| 4,516,914 A | 5/1985 | Murphy et al. |
| 4,519,748 A | 5/1985 | Murphy et al. |
| 4,548,549 A | 10/1985 | Murphy et al. |
| 4,609,329 A | 9/1986 | Pillis et al. |
| 4,747,060 A | 5/1988 | Sears, III et al. |
| 4,829,458 A | 5/1989 | Russo et al. |
| 4,933,881 A | 6/1990 | Schmidt |
| 4,967,381 A | 10/1990 | Lane et al. |
| 5,061,916 A | * 10/1991 | French et al. .......... 379/106.01 |
| 5,079,727 A | 1/1992 | Yasue et al. |
| 5,103,409 A | 4/1992 | Shimizu et al. |
| 5,134,574 A | 7/1992 | Beaverstock et al. |
| 5,144,651 A | 9/1992 | Cooper ........................ 379/98 |
| 5,222,122 A | * 6/1993 | Hamilton et al. ....... 379/106.01 |
| 5,287,293 A | 2/1994 | Chen et al. |
| 5,301,120 A | 4/1994 | Magario |
| 5,311,759 A | 5/1994 | Mangrulkar et al. |

(List continued on next page.)

OTHER PUBLICATIONS

International Search Report dated Mar. 11, 1999—PCT/US98/20515.

*Primary Examiner*—Stella Woo
(74) *Attorney, Agent, or Firm*—John M. Harrington; Kilpatrick Stockton LLP

(57) ABSTRACT

Systems and methods, including modem communications software, for controlling and/or monitoring one or more machines having an control board, such as, for example, compressors, from a remote location is disclosed. The systems and methods provide for each machine being controlled and/or monitored by an operator from the remote location. The machines are controlled and/or monitored using the modem communications software, presently preferably, resident on a personal computer (PC) at the remote location. The methods and systems, including the modem communications software, provide communications between the PC and the machine(s) through transmissions over a communications link established through a modem from a remote PC to a modem connected to the control board of a machine to provide instructions to or receive information from the machine control board and for the remote diagnosis of operating problems, such as, for example, compressor system operating problems, among other features.

57 Claims, 18 Drawing Sheets

U.S. PATENT DOCUMENTS

| | | |
|---|---|---|
| 5,357,441 A | 10/1994 | Petty et al. |
| 5,371,692 A * | 12/1994 | Draeger et al. .......... 379/93.02 |
| 5,373,346 A | 12/1994 | Hocker |
| 5,516,265 A * | 5/1996 | Harrison et al. .............. 417/12 |
| 5,537,322 A | 7/1996 | Denz et al. |
| 5,581,469 A | 12/1996 | Kim |
| 5,592,396 A | 1/1997 | Tambini et al. |
| 5,657,245 A | 8/1997 | Hecht et al. |
| 5,668,741 A | 9/1997 | Prigent |
| 5,696,495 A | 12/1997 | Pitezsch et al. ........ 340/825.05 |
| 5,713,724 A | 2/1998 | Centers et al. ................ 417/53 |
| 5,757,643 A * | 5/1998 | Kuroda et al. ......... 379/102.01 |
| 5,967,761 A * | 10/1999 | Mehaffey .................... 417/286 |

\* cited by examiner

SYSTEMS AND METHODS FOR REMOTELY CONTROLLING A MACHINE

RELATED APPLICATIONS

This application is a continuation-in-part of commonly owned U.S. patent application Ser. No. 08/946,635, filed Oct. 8, 1997, of Centers et al., now U.S. Pat. No. 6,077,051, issued Jun. 20, 2000, which is a divisional of commonly owned U.S. patent application Ser. No. 08/346,251, filed Nov. 23, 1994, of Centers et al., now U.S. Pat. No. 5,713,724, issued Feb. 3, 1998, and a continuation in part of commonly owned U.S. Provisional Patent Application Ser. No. 60/060,650, filed Oct. 1, 1997, of Centers et al., the disclosure of each is herein incorporated by reference.

BACKGROUND OF THE INVENTION

The present application relates generally to systems and methods for remotely controlling and/or monitoring one or more machines, usually compressors, such that each machine's electronic control system can be assessed by an operator from a remote location using modem communications software, presently preferably, resident on a personal computer (PC) at the remote location. More specifically, it relates to systems and methods for the remote diagnosis of compressor system operating problems. Most specifically, it relates to systems and methods for providing communications through transmissions over a communications link established through a modem from a remote PC to a modem connected to the electronic control system of a compressor to provide instructions to or receive information from the compressor electronic control system.

Rotary screw compressors, such as the compressor disclosed in U.S. Pat. No. 4,435,139, have long been used to provide compressed air in industry. Such rotary screw compressor typically comprises two rotors mounted in a working space limited by two end walls and a barrel wall extending there between. The barrel wall takes the shape of two intersecting cylinders, each housing one of the rotors. Each rotor is provided with helically extending lobes and grooves which are intermeshed to establish chevron shaped compression chambers. In these chambers, a gaseous fluid is displaced and compressed from an inlet channel to an outlet channel by way of the screw compressor. Each compression chamber during a filling phase communicates with the inlet, during a compression phase undergoes a continued reduction in volume, and during a discharge phase communicates with an outlet.

Rotary screw compressors of this kind are often provided with valves for regulating the built-in volume ratio for the capacity of the compressor. When continued regulation is required, slide valves are often used, however, with other regulation needs, it is sufficient to use bypass valves. Such bypass valves are mounted in the barrel wall of the compressor or may be mounted in one of the end walls and in this regard, normally in the high pressure end wall. A bypass valve arrangement of this general type is shown in U.S. Pat. No. 4,453,900 issued Jun. 12, 1984. However, the opening of the bypass valve is directly dependent upon the compression spring as well as the internal pressure of the compressor. The opening and closing of this type of valve is unreliable due to friction, corrosion and other environmental factors which often derogate the positioning this type of bypass valve. Further, while the face of the valve element takes on the approximate shape of the barrel, the valve element is separately formed by casting or other process within predetermined tolerances. In order to economically manufacture such valve elements, the tolerances must be some what relaxed which may result in the leakage of pressurized fluid between compression chambers thereby degrading the efficiency of the compressor.

It is known that these compressors may be controlled by electronic circuits, such as those disclosed in U.S. Pat. Nos. 4,336,001 and 4,227,862 to Andrew et al., which show electronically controlled startup and shutdown routines and control of a bypass slide valve to vary compressor output to maintain pressure at a selected setpoint.

U.S. Pat. Nos. 4,519,748, 4,516,914, and 4,548,549 to Murphy et al. and U.S. Pat. No. 4,609,329 to Pillis et al. show additional electronic control systems for compressors. However, the operating modalities of these systems are primarily designed for refrigerant compression.

U.S. Pat. No. 4,502,842 to Currier et al., assigned to Colt Industries Operating Corp., shows a single electronic control system which can be connected to control a plurality of variably sized compressors. The system gathers data on the operating characteristics of the controlled compressors during a calibration phase and then uses this information to load and unload the compressors during operation, maintaining a preset pressure which can be programmed to vary with time. High and low pressure set points are programmed into the electronic control system and the compressors are selective loaded and unloaded in a predetermined sequence. However, centralized master controllers of this type represent a single point of failure for the entire pressurized air system, and are lacking in versatility since they provide only a limited selection of control modalities.

U.S. Pat. No. 4,335,582 to Shaw et al. shows a system for unloading a helical screw compressor in a refrigeration system. A slide valve is connected so that upon compressor shutdown, the slide valve is automatically driven to a full unload position. This operation is accomplished with air pressure rather than with an electronic control system.

None of the electronic control systems described above provide a complete and versatile solution to the control and maintenance problems experienced when operating one or more compressors in a variety of facility installations with a variety of air storage capacities. In fact, the networking capabilities and choice of operating modes in prior art systems of the type described above, and the ability of the control systems to provide reliable local and remote real-time operating parameter monitoring and remote real-time operating parameter adjustment to respond to actual operating conditions are quite limited.

Compressed air is a fundamental energy source required in most industrial manufacturing facilities. The location and maintenance schedule of the compressors that provide the compressed air is not usually very well thought out. The compressor is usually located in some dark corner of the facility or in a remote building. Maintenance is, in many cases, only performed on the compressors if the air pressure in the facility begins to fall. Thus, one significant problem with almost all air compressor installations is ease of monitoring the compressor to determine when and what maintenance might need to be performed. Another significant problem with almost all air compressor installations is the need for a local operator to monitor the compressor and to input control commands into the compressor electronic control system.

One possible approach to eliminating the monitoring, control and maintenance of compressed air facilities is to have a distributor provide a turnkey facility compressed air system to the facility and to assume all monitoring, control and maintenance responsibilities therefore. By installing a turnkey facility compressed air system, local facility management would turn over complete responsibility for compressed air to the distributor including everyday monitoring, operational control and maintenance of the facility compressed air system.

However, unless there is some way to monitor and control the compressors of the facility compressed air system from a remote location, a distributor would have to hire personnel to be on site with the compressors 24 hours a day, 7 days a week. This constant present would be expensive and may result in the assumption of such responsibility of the facility compressed air system by the distributor being cost prohibitive. Therefore, it would be desirable to develop systems and methods for remotely monitoring and controlling the operation of a facility compressed air system so that the responsible personnel are not required to be on site with the compressors 24 hours a day, 7 days a week.

In situations, such as, for example, missile launch pads, where it is impractical or impossible to have a local operator located with the compressors to monitor the compressor installation and to input control commands into the compressor electronic control system, it is vitally important for launch officials to know if the compressed air source at each launch pad is running or available to run during the launch process, if needed. Typically, a number of backup compressors are positioned at each launch pad that can provide compressed air in the event of the failure of one or more compressors. Even with this backup system, missile launch officials recognize that being able to remotely monitor and control the operating conditions of the air compressor system would be beneficial, since, not knowing the exact status of any one compressor at a particularly critical time could pose a risk to the launch process. Thus, in these type situations, it would be desirable to be able to remotely monitor these types of air compressor systems to determine if the compressors are running or if they are available to run and to remotely control the operational status of each compressor in order to react in a timely fashion to any unscheduled compressor shutdown or other potentially critical event.

Thus, there is a need for systems and methods for controlling the compressor(s) of a compressed air system from a remote location. Such systems and methods should have a communications capability for communications between the compressed air system and the remote location. Such systems and methods should provide for the real-time monitoring and control of the compressor(s) of the compressed air system from the remote location. Such systems and methods should provide for improved real-time operating parameter monitoring and real-time operating parameter adjustments to control compressor operations without the need for dedicated compressor technical personnel on site with the compressors.

SUMMARY OF THE INVENTION

It is a primary object of the present application to provide systems and methods for remote access to a network of electronic compressor control systems.

Another object of the present application is to provide systems and methods for remote access to a network of electronic compressor control systems for permitting monitoring through a link to a single system in the network.

Yet another object of the present application is to provide systems and methods for remote access to a network of electronic compressor control systems for permitting control of one or all of the compressors in the network through a link to a single system in the network.

A further object of the present application is to provide systems and methods for remote access to a network of electronic compressor control systems for permitting diagnosis of one or all of the compressors in the network through a link to a single system in the network.

A still further object of the present application is to provide systems and methods for remote access to a network of electronic compressor control systems for permitting firmware updates of any electronic control system of one or all of the compressors in the network through a link to a single system in the network.

Another object of the present application is to provide systems and methods for controlling the compressor(s) of a facility compressed air system from a remote location.

Yet another object of the present application is to provide systems and methods for communications between the facility compressed air system and the remote location.

A further object of the present application is to provide systems and methods for the real-time monitoring and control of the compressor(s) of the facility compressed air system from the remote location.

A still further object of the present application is to provide systems and methods for real-time operating parameter monitoring and real-time operating parameter adjustments to control compressor operations without the need for dedicated compressor technical personnel on site.

In accordance with these and further objects, one aspect of the present application includes a system for remotely controlling at least one machine, the system comprising: at least one computer having a modem communications software computer program operatively programmed therein; at least a first modem operatively connected to the computer; at least one machine having at least one control board operatively connected thereto, the computer being located at a site remote from the at least one machine; at least a second modem operatively connected to the control board for communication with the at least first modem; and communication means, operatively connecting the at least first and the at least second modems, for transferring data in both directions between the at least one control board and the at least one computer.

Yet another aspect of the present application includes a system for remotely controlling at least one machine, the system comprising: at least one computer having a modem communications software computer program operatively programmed therein; at least a first modem operatively connected to the computer; a plurality of machines, each machine having a control board operatively connected thereto, the computer being located at a site remote from the machines; network means for operatively connecting the control boards of the plurality of machines together; and communication means, operatively connecting the at least first and the at least second modems, for transferring data in both directions between the at least one control board and the at least one computer.

A still further aspect of the present application includes a method for remotely controlling at least one machine, the method comprising the steps of: providing at least one computer having a modem communications software computer program operatively programmed thereon; operatively connecting at least a first modem to the computer; providing at least one machine having at least one control board operatively connected thereto, the machine being located remote from the computer; operatively connecting at least a second modem to the control board; and operatively connecting the at least first and the at least second modems such that data is transferred between the at least one control board and the at least one computer in both directions.

Other objects and advantages of the application will be apparent from the following description, the accompanying drawings and the appended claims.

DETAILED DESCRIPTION OF THE INVENTION

Figure 1:
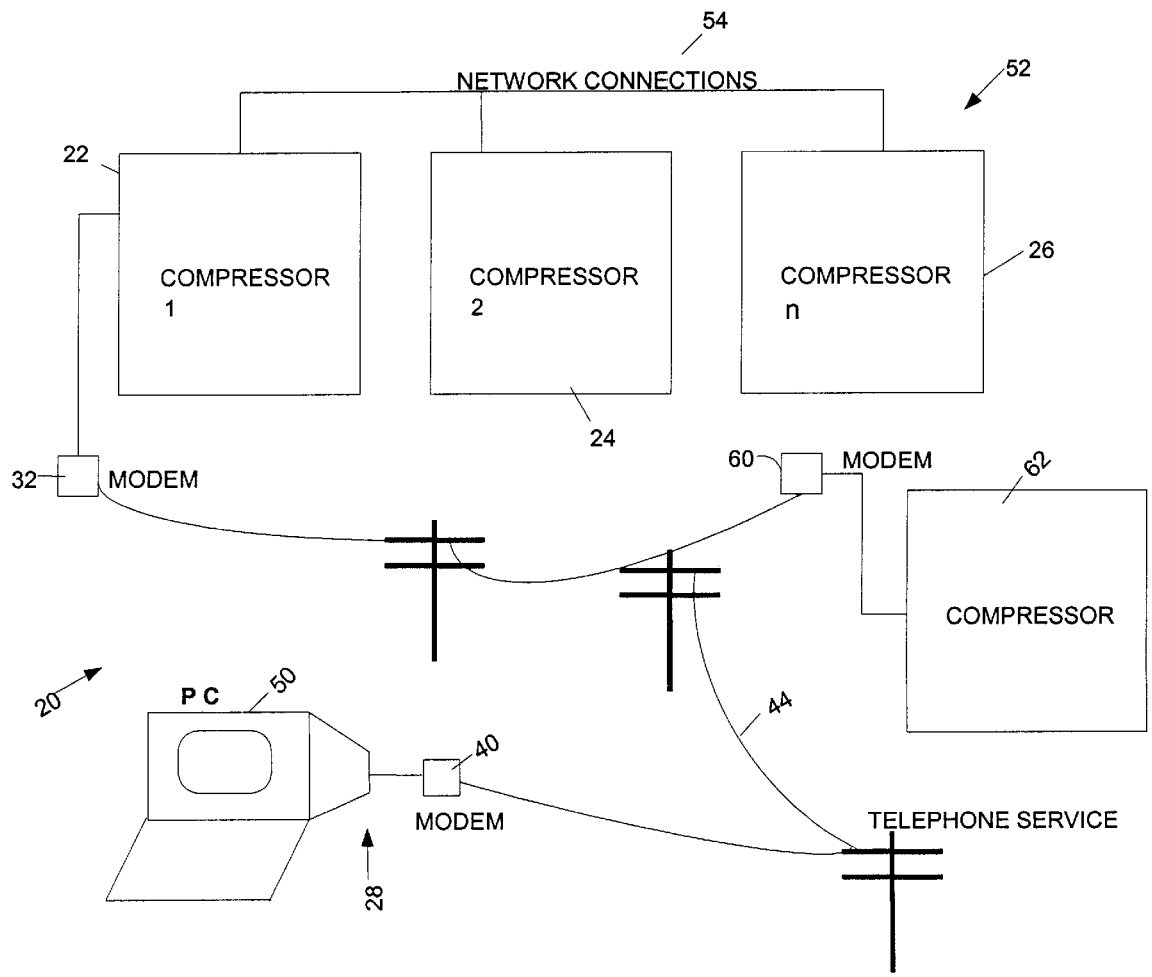
FIG. 1 is a block schematic diagram showing network and remote communications configurations using the compressor control system of the present invention.
Figure 2:
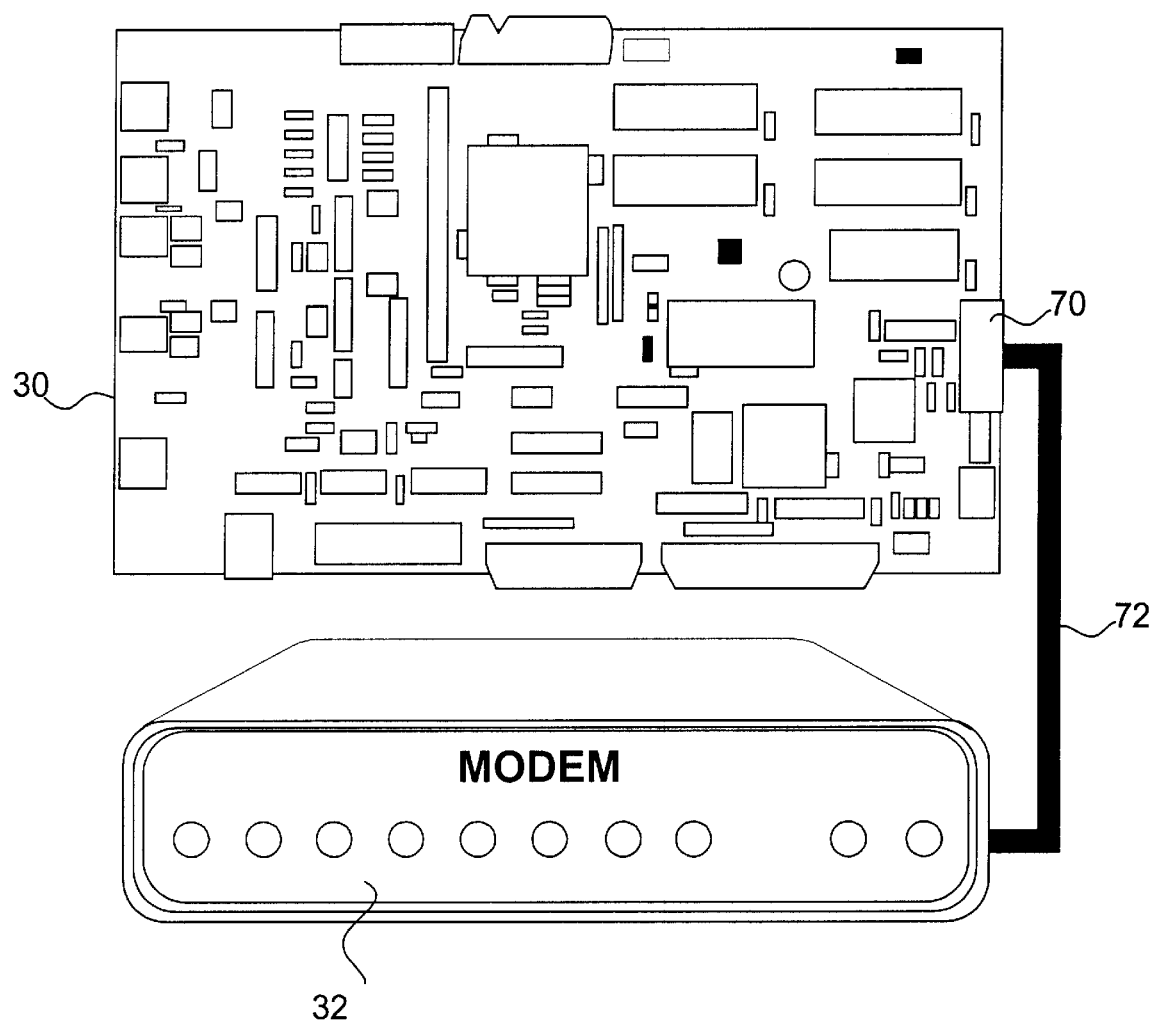
FIG. 2 is a block schematic diagram showing the electrical control elements in a preferred embodiment of an electronic control system, connected to a modem.

As shown in FIGS. 1 and 2, the present application is directed to systems 20 and methods for monitoring and/or controlling, from a remote location 28, one or more compressors or machines, 22, 24, 26, each compressor having parameters associated therewith. The systems and methods of the present application for remotely assessing one or a network of compressors include an electronic control system, microprocessor board, or control board 30 operatively connected to the one or more compressors and an electronic communications device 32 such as a modem operatively connected to the control board 30, it being understood that each compressor in the network has its own control board 30. The electronic control system or control board 30 is in communication with the modem 32 and other control boards 30 at each compressor 22, 24, 26. The control board 30 includes logic means and a memory. The logic means is for ascertaining certain parameters from the compressor, storing the parameters in the memory, transmitting at least certain of the parameters to the modem 32 in response to a request from another modem 40 generated by a modem communications software resident on a computer (PC) 50. The modem 32 is effective for transmitting the request from the remote PC to the control board 30, receiving the parameters from the control board 30, and transmitting the parameters for display at the remote location 28.

As described in U.S. Pat. No. 5,713,724, the modem 32 may be installed in the compressor control board 30 housing (not shown) or may be a standalone component. A network connection 54 provides a network interface connection for linking multiple control boards 30 at a potential compressor site, such a, for example, networked compressor site 52. Preferably, the network connection 54 provides an ARCnet standard peer-to-peer network interface.

As also described in U.S. Pat. No. 5,713,714, the control board or microprocessor 30 is provided with a serial interface for connecting to the modem 32, which may be a conventional wireline telephone modem. Modem 32 permits communication between control board 30 and remotely located stations for purposes of real-time operational control, monitoring, maintenance and service diagnosis, transmission of status reports, and downloading operating firmware for control board 30 from the PC 50 at the remote location 28. In a modem mode of operation, control board 30 can be called by a phone line 44 from the remotely located PC 50. When a connection is made, the remote PC 50 can access all information of control board 30 that can be seen by a local operator. All operating parameters, service information, and shutdown records stored in control board 30 are transmitted to the remote PC 50. All sensor input information, including sensed temperatures and pressures, are transmitted to the PC on a real time basis. The information displayed for the operator of control board 30 is also displayed on the remote PC 50.

All of the stored operating parameters of control board 30 can be modified by the operator of the PC 50 through transmissions over the link established through modem 32. In addition, control board 30 can receive a message from the PC 50 and display the message on a display to provide instructions or information to the local operator. This feature is particularly useful for remote diagnosis of system operating problems.

In addition, new control firmware may be downloaded to control board 30 from the remote PC 50, and stored in flash memory provided for that purpose on microprocessor board 30. To cause entry into a firmware download mode, a local operator must power down control board 30, and hold down the F3 button in a switch array (see U.S. Pat. No. 5,713,724) while powering up control board 30. During and after the firmware downloading process, control board 30 is also programmed to perform integrity checks on downloaded firmware, such as byte-by-byte verification and/or checksum verification, to ensure integrity of the new firmware before permitting restarting of compressors 22, 24, 26.

A local RS232 port will also be provided as part of microprocessor board or control board 30, as described in U.S. Pat. No. 5,713,724 with reference to FIG. 5. This local RS232 port can be used to connect control board 30 to local PC (not shown). Control board 30 will provide the same control, monitoring, and firmware updating functionality via the local RS232 port, the only difference being that the PC will be directly connected to control board 30 rather than being connected via modem 32.

Firmware. updates may be transmitted from a remotely located station at the system manufacturer or a maintenance center, if system 30 is equipped with modem 32, as previously described. Firmware storage chips in the system may be, for example, AT 29C010-12PC 120K×8 flash EEPROMs with 120 nanosecond access time. Random access memory chips are presently preferably SRM20100LC100 low power 128K×8 static RAM integrated circuits with 100 ns access time, which provide more memory than is used in the present embodiment, leaving room for future expansion of system functions. If desired, 32K×8 RAM chips may be substituted, as a lesser amount of memory is sufficient for operation of the embodiment disclosed herein.

FIG. 1 is a block schematic diagram showing network and remote communications configurations of a networked compressor system 52. In FIG. 1, a plurality of compressor systems 22, 24, 26 etc. are shown in a network configuration, connected by network wiring 54. Network wiring 54 connects compressors 22, 24, 26 in a multidrop configuration according to the EIA RS-485 standard and carries information between the compressors 22, 24, 26 using standard ARCnet protocol.

To permit remote monitoring and control of the compressor networked system 52, one of the compressors, such as, for example, 22 is connected to modem 32 which is connected to, presently preferably, a conventional telephone jack. Each telephone jack is connected to a, presently preferably, conventional telephone system which provides conventional telephone line 44 connection to remotely located PC 50.

Modem 40 operates to transfer information to PC 50 and to receive commands and control signals from PC 50 in the manner described above with reference to FIG. 2. When a plurality of compressors 22, 24, 26 are connected in a network, as shown in FIG. 1, commands received via modem 32 by the compressor 22 connected to modem 32 may be transmitted over the network 54 to the other compressors 24, 26 in order to provide for the remote control, via the modems 40, 32 of all functions of all the compressors in the network 52.

Modem 32 permits remote monitoring of compressor operation for diagnosing service problems, allowing a serviceman to be better prepared to fix the problem before leaving his shop. Remote monitoring and data retrieval can also be used for optimization of compressor operational control. Data is stored in control board 30 and can be retrieved for fine tuning or evaluation of unload and load pressures, auto/dual time-out values, and multiple compressor configurations, as described in U.S. Pat. No. 5,713,724.

In addition, compressor parameters can be configured and reconfigured in real-time from the remote site 28. After examining the data transmitted by compressor system 52, the remote operator can adjust the appropriate operating parameters for improved compressor operation.

Finally, if any firmware problems are found in the field, the unique combination of this modem link and the flash memory provided in the control board 30 permits the updating of the system firmware on the control board 30 immediately without any need for an on-site service call. In addition, the features of the systems and methods of the present application provide for the addition of any special firmware options not originally installed in the compressor control board 30, as desired, without an on-site visit.

Of course, the above-described uses of modem 32 are not limited to network operation, and a modem 60 can be provided on a standalone compressor system 62 to perform these same functions for a standalone system.

The operation of the control firmware on a microprocessor board of control board 30 provides significant advantages. While the operation of this firmware is described in complete detail in the flowcharts and documented source code in the microfiche appendix of U.S. Pat. No. 5,713,724, selected operating features will be briefly described herein for the convenience of the reader.

One significant advantage of control board 30 is the ability to regulate the compressors pressure output in any of four pressure regulation operating modes, under control of an operator, depending on the requirements of the particular installation at the time. In addition, numerous other control features are available from the facility air system's operating menus. For example, lift valve operation can be selectively disabled through a setup menu, or via a command received from the remote station 28 through modem 32 and/or network connections 54 of the facility air system.

The first three operating modes are single-machine modes, wherein compressor system 62 operates substantially independently of any other compressors at the same location. The fourth operating mode is a networked machine operating mode, wherein compressor 22 communicates with other compressors 24, 26 having the same model control board 30 and feeding the same service air system, and coordinates compressor 22 operation with that of the other compressors 24, 26 to maintain a desired pressure in the facility air system.

As indicated previously, in addition to the three single-machine operating modes described above, control board 30 can operate in a networked multiple machine mode. In the Network Mode, all compressors 22, 24, 26 transmit information to all other compressors specifying their capacity and specifications, configuration, maintenance status, current load setting including actuation condition of each of the compressor valves and current measured line pressure at their respective facility air connection.

Each compressor's control board 30 stores the information received from the other networked compressors and coordinates operations based on this information about the networked facility air system 52. Each networked control board 30 is a peer of the other compressor control boards in the network, so there is no single control board 30 serving as a master control unit. Since each control board 30 constantly maintains full information about network status and controls its own operation based on the data received from all other networked compressors, a failure in any particular compressor will not prevent continued network operation. The failure of a compressor control board to communicate with the other networked control boards will result in automatic reconfiguration of the network to operate without that particular compressor.

For operation in the network mode, the control board 30 of each compressor system 22, 24, 26 automatically identifies itself to the other compressors on the network based on a predetermined code, such as, for example, letter code A, B, C, D . . . P, assigned by an operator during the compressor system installation and stored in nonvolatile memory. This letter code is assigned by the operator for purposes of prioritizing machine operation, as will be explained in more detail below.

Upon startup of one 22 or more compressors 24, 26, the network 52 automatically configures itself by dynamically assigning a unique network node number to each compressor control board 30 for network communication purposes. This automatic configuration of the network occurs without regard to the order of starting of the compressors, and the networked control board 30 systems automatically determine the total number of compressors on the network. If a compressor is added or removed from the network, it is not necessary for the operator to change the compressor total stored in the compressor control boards 30.

The connected control boards 30 continuously maintain and exchange operating status information, and each compressor maintains full operating status information on all other compressors in the network. This information preferably includes, for example, whether the compressor is running or stopped, and if stopped, whether the stop was the result of a programmed shutdown such as a time-out, safety shutdown, manual shutdown, or other cause; whether the lift valve algorithm is enabled or disabled; the status of the lift valves (open or closed); the compressor's current line pressure and sump pressure; the discharge temperature and sump temperature; the compressor's load and unload pressure settings; the model number, capacity, horsepower, and voltage of the system; whether the compressor is air or water cooled; the state of the oil filter delta pressure switch; the state of the air cleaner delta pressure switch; the state of the motor overload relays; the state of the main motor starter auxiliary contacts; the total hours on the air filter, oil filter, and separator element; the total compressor loaded hours and unloaded hours; the number of unloaded minutes until the compressor shuts down (current auto/dual timer value), compressor's node number; and the number of hours left on the compressor's multiple machine timer. Also, additional special purpose sensors, such as an air flow sensor, may be connected to any particular compressor in the network, using the general input expansion provisions of control board 30, as described in U.S. Pat. No. 5,713,724 with reference to FIG. 5, and all compressors on the network can receive sensor readings from a single sensor, rather than providing separate sensors for each compressor.

The storage of all this information in each compressor control board and the provided capability of transmitting this information across the network and to remote locations using modem 32 provides for monitoring and controlling operations and coordination of multiple compressors that are significantly advanced over known prior art systems. The maintenance in each compressor control board 30 of up-to-date status and configuration information on every other networked compressor system is another advantage of the systems and methods of the present application, in cases where the modem 32 is connected to any of the networked compressor systems 22, 24, 26 (as shown in FIG. 1). Under these circumstances, status information of all networked compressors 22, 24, 26 can be transmitted by that networked system 52 to the remotely located station 28 for real-time monitoring and control purposes.

When setting up the network, the operator assigns each compressor system 22, 24, 26 in the network 52 a unique sequence identifier such as A, B, C, D, etc. which is used for sequencing and scheduling of the compressors in the network. The term "sequencing" refers to the order in which networked compressors will be brought on and off line to satisfy a system demand. The term "scheduling" refers to the time and day that a particular sequence is to be used. Preferably, control board 30 can store a plurality of sequences along with day and time specifications, and can use the specified sequences at the specified times on the specified days. The goal of proper scheduling is to assign a sequence to a particular time that will assure that the compressors running will be operating as close to full load as possible.

The number of sequences used in a networked system 52 is dependent on several factors. One factor is operator preference. Control board 30 is provided with a default sequence (alphabetical beginning with "A") and will run in this sequence at all times unless an operator specifies scheduling of different default sequences. Networked systems will work fine with only one sequence. Networked systems that use multiples of an identical model compressor may use only one sequence or may use the same number of different sequences as there are machines on the network, thereby equalizing the operating hours on all compressors.

Prior to ordering a facility air compressor system, in order to optimize energy savings, a study of facility air capacity needs should be conducted and compressor scheduling should be planned as part of the process of sizing the compressors in the compressor network. In this way, the proper sized compressors can be ordered to supply the various facility air system demands using the least amount of power.

The Network Mode of control is used with a plurality of compressor systems 22, 24, 26 connected to a single service facility air system, as described with reference to FIG. 8 in U.S. Pat. No. 5,713,724. Like the single machine target pressure mode described above, the network mode uses an operator adjustable target pressure as a basis for controlling the response of all of the compressor systems 22, 24, 26 to changes in service facility air system demand.

In this mode, the control boards 30 connected in the network 52 pass an operating pointer, which is distinct from the communications transmission token, and only the machine having the operating pointer can take action to adjust its output capacity. A sequence for startup of the connected compressors as demand increases is programmed into at least one of the connected compressors (unless the default A, B, C . . . P sequence is desired, in which case no programming is necessary) and transmitted to the other compressors in the system. The operating pointer is held by the compressor system that is the next to have its capacity increased in response to a demand increase, according to the programmed sequence. When the compressor system having the pointer is running at full capacity, it passes the pointer "to the right," that is, to the next compressor in the sequence. If demand drops and the compressor system holding the pointer has reduced its capacity by 50% by actuating the capacity reduction valves, it passes the pointer to the preceding system in the programmed sequence. If further capacity reduction is required, the compressor system receiving the pointer will then sequentially actuate its capacity reduction valves until it has opened all four lift valves and reduced its capacity by 50%, at which time it will pass the pointer "to the left," that is, to the next preceding compressor system in the programmed sequence.

With the compressor system at full load, that is, all connected compressors operating at their maximum output, an increase in service air pressure above the target pressure indicates a drop in demand. Control board 30 of the last machine in the sequence, having the pointer, will respond by opening the first valve of the last machine in the sequence. If the pressure remains above or moves above the target pressure again, the control will open additional valves on the last machine to maintain the target pressure. If all valves on the last machine are open and the service air pressure is still above the target pressure, that machine will continue to run at 50% of its capacity and the pointer will be passed "left" to the preceding compressor in the. sequence, which will begin opening its valves as necessary to reduce service facility air pressure.

Now with reference to FIG. 2, a serial port 70 is included on a control board 30 associated with a compressor to provide communications with other devices. It is possible to connect a standard external modem designed for personal computer use to this port 70 using a serial or modem cable. With an external modem 32 connected to the control board 30, the PC 50 equipped with the modem 40 can transmit and receive information over standard telephone lines 44 to one compressor 62 or a networked compressor 22 in compressor network 52.

Because of the amount of compressor control possible with the systems and methods of the present application, security for preventing unauthorized access of the compressor 62 through the modem 60 or the networked compressors 52 through the modem 32 is provided. In the systems and methods of the present application, two levels of security have been implemented. The first level of security is provided by a software locking key (not shown) manufactured by Aladdin Knowledge Systems Inc. This level of security prevents anyone from installing or using the modem communications software useful with the present application on a PC without the software locking key. The software locking key is a hardware device that plugs into the printer port on a PC.

The second level of security uses the serial number of at least one of the networked compressors. When a compressor controlled by the control board 30 is configured for shipment to a customer, part of the production setup for the compressor system is to record into the control board 30 the serial number of the compressor. When the modem communications software used with the present application is ordered, the serial number for the compressors that the modem communications will be communicating with are embedded within the modem communications software on a floppy disk that is delivered to the end user. When the modem communications software running on the PC 50 makes contact with the compressor 22, one of the first things to happen is a request for the serial numbers of the compressor (s). If the serial number(s) cannot be obtained or if they do not match an authorized serial numbers, the modem communications software breaks the electronic connection with the modem 32 immediately.

With the modem communications software installed on a PC, an operator can monitor each compressor 22, 24, 26 in a network 52 of compressors from just one modem 32 connected to one of the compressors 22. The control board 30 presently allows up to sixteen (16) compressors to be networked together.

The modem communications software used with the systems and methods of the present application is capable of retrieving all of the information available in the control board 30. This information includes, but is not limited to, Loaded running hours, Unloaded running hours, Air filter hours, Fluid filter hours, Separator element hours. Also, indicators show the condition of the Air filter, Fluid filter, and Separator element.

The Compressor state, loaded or unloaded, is displayed by the PC 50 at the remote location 28. If the compressor is shutdown, the reason for the shutdown is displayed at the remote location 28. If the compressor is running, then the mode of operation, Continues run, Auto-Dual, or Network mode is displayed by the PC at the remote location. If the compressor is running, then the number of capacity reducing valves known as lift valves that are open is displayed by the PC 50 at the remote location. And if the compressor is running in Network mode, the status of the Network pointer is displayed by the PC at the remote location. The Network pointer is a software flag that is used in the Network operating mode to determine which compressor in a Network of compressors is able to make capacity adjustments.

The Load and Unload pressure settings for the compressor is displayed by the PC at the remote location. If the compressor is running in Network mode, then the percent of the Network capacity and horsepower that is being used is displayed by the PC at the remote location. If the compressor is running in Network mode, the total capacity and horsepower of the network that is being used is displayed by the PC at the remote location. Also if the compressor is running in Network mode the average network pressure is displayed by the PC at the remote location. This display represents the average of the local pressures of all of the compressors running in the network.

The serial number, model, rated capacity, rated horsepower, machine type, starter type, and software version number of the compressor that is being monitored is displayed by the PC at the remote location. The discharge and sump temperatures and pressures are displayed as they appear at the compressor you are monitoring. All of this information for each compressor in a Network can be viewed and printed, if desired, by the PC at the remote location.

Each compressor control board 30 keeps a log of any shutdowns its compressor may have experienced. The type of shutdown as well as the time and date of the shutdown are recorded in a nonvolatile memory chip in the control board 30. The PC 50 having the modem communications software operating thereon to which the modem 32 is attached can access this shutdown log for a single compressor, or any compressor in a Network, and display the shutdown history of the compressor, save it to a file, or print it at the remote location.

Any time the PC 50 is communicating with a single compressor 62 or a network of the compressors 22, 24, 26, the modem communications software installed on the PC is collecting data from all active compressors that can be accessed through the modems 60, 32 at the compressor site. The number of compressors at the compressor site that are Networked to the modem 32 will determine how frequently data is retrieved from each compressor. Typically, this operational data is obtained on an interval from each compressor that ranges from about 5 to about 20 seconds.

A data log file is created on the PC 50 for all, presently preferably, sixteen (16) possible compressors that could be Networked together. If any of these compressors are found active, then data is recorded in the log file for that compressor. This data contains information including, but is not limited to, Discharge Temperature, Discharge Pressure, Network Average Pressure, Percent of CFM used, Percent of Horsepower used, Percent of Total Networked Horsepower used, Percent of Total Networked CFM used.

Time and Date data is recorded by the PC along with this data so that the data can be graphed and displayed on the PC 50 operating the modem communications software or other graphic display software, such as, for example, excel or equivalents. The graphed data appears with the X axis of 0 to 24 hours and the Y axis set for the appropriate scale and range to suit the data. This graphed data can also be printed at the PC location, if required. With this data recorded over a period of time, a well tailored sequence and schedule for a Network of compressors can be developed.

Each compressor in a Network of compressors has a unique identity. This identity is user selectable at the time of instillation. So the sequence is the order of compressor identities that the Network will operate with. The control board 30 presently allows up to nine (9) sequences to be used.

The schedule is the day of the week and the time of the day that a sequence will be used in the Network of compressors. The control board 30, presently preferably, allows a repeating 7 day schedule with 9 different time slots for each day to be used.

With the modem communications software installed on PC 50, remote monitoring and control of a networked compressor facility air system can include modification of the sequence and schedule information. This can be accomplished by retrieving the sequence and schedule information from any compressor in a Network of compressors 52 utilizing the modem communications software installed on the PC 50 with the modem 32. The sequence and schedules can then be saved and or modified on the PC 50 and then transmitted back to the Network of compressors 52 through the modem 40 and the modem 32 to the control board 30.

Using the modem communications software on the present application installed on a PC, compressors, in the Network 52 can be selectively unloaded and shut down by simply setting up a sequence that does not include the compressor and scheduling this sequence for a day and time of the week that such shutdown of the compressor is desired. When that scheduled day and time is reached, any compressors that are not included in the instruction sequence are shut down and are not allowed to run until they are included in a sequence that is scheduled at a later time. In essence, such remote scheduling allows selectively off loading compressors when there is no demand for them, or during high electrical peak demand periods when there might be a billing penalty if a compressor that is not needed might start because of fluctuating facility air pressures.

The compressor(s) can be remotely loaded and unloaded and remotely stopped and started by commands initiated by the modem communications software on the PC and communicated to the compressor(s) through the modem 32. All of the compressor(s) operating parameters can be remotely modified by commands initiated by the modem communications software on the PC 50 and communicated to the compressor(s) through the modems 40, 32. These modifications include, but are not limited to, the compressor load and unload pressure settings, the Auto-Dual timer setting, the target pressure setting, the time and date settings, the mode of operation, the number of lift valves that are open or closed (this controls the compressor's delivered capacity).

The system 20 also provides effective alarms at the remote location if the compressor should shut down other than for a scheduled shutdown. Along with the remote alarms, the system 20 provides a description of the cause of the unscheduled shutdown at the remote location. Knowing the cause of the unscheduled shut down can help determine what course of action is needed to get the compressor running and back on line as quickly as possible.

Because energy usage in any industrial facility is a big concern, the system 20 provides the ability to monitor and record how much compressed air demand is placed on the compressors over time. This information can provide the owner of the compressors the means to more efficiently utilize the compressors and thereby save energy and money.

The system 20 can also provide the means to automatically establish and setup a network of compressors. By using the PC to analyze the data collected with the modem from each compressor, a usage trend could then be determined and the appropriate sequences and schedules generated and transmitted back to the network of compressors.

As illustrated in FIG. 1, the PC 50 with a modem 40 can access a single compressor 62 anywhere a phone line 44 could be installed or it could access a network 52 of up to sixteen (16) compressors in a single network of the possible unlimited networks. It should be understood that there is no theoretical limit to the number of compressor systems, locations, or networks that could be accessed but the illustrated control system 30 has a practical limit of sixteen (16) compressors ina single network. To connect the modem 32 to the control board 30, a cable with the appropriate wiring connections is connected to the modem 32 and then connected 70 on the control board 30. The control board 30 is where the logic resides for the control of a compressor. Without the control board 30, no compressor will be able to efficiently control it's capacity. The details of the logic and the associated software are described in U.S. Pat. No. 5,713,724 with reference to FIGS. 2 and 5a–i.

When the modem 32 is connected to a suitable phone line using conventional phone jacks, with power applied to the modem using conventional methods, the control board 30 sends an initialization string to the modem 32 when the compressor system 52 powers up. This initialization string tells the modem 32 to go into an answer mode and to pick up on any incoming phone call on the first or second ring. The initialization string also tells the modem at what speed it will be communicating with incoming calls. Once the modem 32 is initialized it will try to establish a communications connection with any incoming phone call. If it fails to establish communications, it will hang the phone line up so that another incoming call can be made.

If the modem 32 succeeds in establishing a communications connection, the modem 32 will send any data that it receives over the phone line to the control board 30. If this data is not recognized by the control board 30, the control board 30 will reply with an error message that is sent to port P1 70 to the modem 32 and then through the phone line 44 back to the source of the data.

If the source is a PC running the modem communications software, it will recognize that the reply to its data request is an error message and will resend the data request again. If after three tries the software cannot get a reply and there are no other active compressors networked to the compressor with the modem 32, the modem 32 will hang up.

Following are example data structures for various possible messages between the PC 50 at the remote location and the control board 30 at a compressor:

Data Structure for ERROR Message from the Control Board

Source Node is the machine ID number of the machine sending the ERROR message. This will be 1 through 16 base Node and for the modem which will always be 255 base 10 or FF hex number. The next two bytes of the message contain the byte count of this message and would be used by the modem communications software on the PC to determine how many bytes of the message the CRC number was calculated for. The next byte of the message is just a marker for the Start of the Message. The next byte of the message is the Function Code and is the unique code for this message and for all other messages, in this particular message it is a 2. The next byte of the message is the Subfunction Code, this is used as a error code for this message. The error codes indicate the following, unrecognized request, or bad CRC. Either of these conditions can be caused by corrupted data in the request messages originated at the PC. The next two bytes of the message contain the CRC number for this message. CRC numbers are a well established form of error checking for digital messages and this CRC conforms to the common methods used. The next byte is the End of Message byte and is always a 253 base 10 or FD hex number.

0x00, /* 0—Source Node */
    0x00, /* 1—Destination Node */
    0x00, /* 2—MSB of bytecount */
    0x06, /* 3—LSB of bytecount */
    0xFE, /* 4—Start Message */
    0x02, /* 5—Function Code */
    0x00, /* 6—Subfunction Code */
    0x00, /* 7—Upper Byte of CRC */
    0x00, /* 8—Lower Byte of CRC */
    0xFD /* 9—End Message */

Data Structure for a Status Request Message to the Control Board

This is the message that the modem communications software running on a PC 50 sends through the modem 40 over the phone lines 44 to the modem 32 associated with a compressor 22 and then to the control board 30 in order to obtain the standard operating conditions of the compressor 22.

All of the individual bytes of the message have already been explained, with the following exceptions. The Function Code is the real trigger for this message, it is a 3 and this always means that this is a request for the standard operating conditions. The Subfunction Code is not used for this message and is always zero.

0x00, /* 0—Source Node */
    0x00, /* 1—Destination Node */
    0x00, /* 2—MSB of bytecount */
    0x06, /* 3—LSB of bytecount */
    0xFE, /* 4—Start Message */
    0x03, /* 5—Function Code */
    0x00, /* 6—Subfunction Code */
    0x00, /* 7—Upper Byte of CRC */
    0x00, /* 8—Lower Byte of CRC */
    0xFD /* 9—End Message */

Data Structure for a Status Reply Message from the Control Board

This is the message that the control board 30 sends through the modem 32 that it is connected to, over the phone lines 44 to the modem 40 connected to the PC 50 running the modem communications software. The bytes of the message up to the Function Code have already been explained. The Function Code for this message is 4 and this identifies this message as containing the standard operating condition of the compressor's. The Subfunction Code has no meaning for this message and is zero. Status Message Structure MSB and Status Message Structure LSB are not used for this message at this time and are always zero.

The data structure for a Status Reply is as follows with and explanation for each byte.

0x00, /* 0—Source Node */
    0x00, /* 1—Destination Node */
    0x00, /* 2—MSB of bytecount */
    0x52, /* 3—LSB of bytecount */
    0xFE, /* 4—Start Message */
    0x04, /* 5—Function Code */
    0x00, /* 6—Subfunction Code */
    0x00, /* 7—Status Message Structure MSB */
    0x02, /* 8—Status Message Structure LSB */
    0x00, /* 9—Compressor State */
    0x00, /* 10—Shutdown State */
    0x00, /* 11—Compressor Mode of Operation */
    0x00, /* 12—Load Pressure */
    0x00, /* 13—Unload Pressure */
    0x00, /* 14—Line Pressure */
    0x00, /* 15—Sump Pressure */
    0x00, /* 16—Discharge Temp */
    0x00, /* 17—Sump Temp */
    0x00, /* 18—Oil Filter Switch */
    0x00, /* 19—Intake Filter Switch */
    0x00, /* 20—Bypass Valves */
    0x00, /* 21—Motor Overload */
    0x00, /* 22—Main Motor Auxiliary */
    0x00, /* 23—Air Filter Seconds MSB */
    0x00, /* 24—Air Filter Seconds */
    0x00, /* 25—Air Filter Seconds */
    0x00, /* 26—Air Filter Seconds LSB */
    0x00, /* 27—Oil Filter Seconds MSB */
    0x00, /* 28—Oil Filter Seconds */
    0x00, /* 29—Oil Filter Seconds */
    0x00, /* 30—Oil Filter Seconds LSB */
    0x00, /* 31—Separator Filter Seconds MSB */
    0x00, /* 32—Separator Filter Seconds */
    0x00, /* 33—Separator Filter Seconds */
    0x00, /* 34—Separator Filter Seconds LSB */
    0x00, /* 35—Loaded Seconds MSB */
    0x00, /* 36—Loaded Seconds */
    0x00, /* 37—Loaded Seconds */
    0x00, /* 38—Loaded Seconds LSB */
    0x00, /* 39—Unloaded Seconds MSB */
    0x00, /* 40—Unloaded Seconds */
    0x00, /* 41—Unloaded Seconds */
    0x00, /* 42—Unloaded Seconds LSB */
    0x00, /* 43—Machine Model */
    0x00, /* 44—Machine Capacity */
    0x00, /* 45—Starter Configuration */
    0x00, /* 46—Horsepower */
    0x00, /* 47—Machine Type */
    0x00, /* 48—Auto Dual Timer */
    0x00, /* 49—Node Number */
    0x00, /* 50—DAM Rotation Time */
    0x00, /* 51—Bypassing Enabled */
    0x00, /* 52—Modulation Enabled */
    0x00, /* 53—Auto-Dual Timer value */
    0x00, /* 54—Character 1 of Serial Number */
    0x00, /* 55—Character 2 of Serial Number */
    0x00, /* 56—Character 3 of Serial Number */
    0x00, /* 57—Character 4 of Serial Number */
    0x00, /* 58—Character 5 of Serial Number */
    0x00, /* 59—Character 6 of Serial Number */
    0x00, /* 60—Character 7 of Serial Number */
    0x00, /* 61—Character 8 of Serial Number */
    0x00, /* 62—Character 9 of Serial Number */
    0x00, /* 63—Character 10 of Serial Number */
    0x00, /* 64—Character 11 of Serial Number */
    0x00, /* 65—Character 12 of Serial Number */
    0x00, /* 66—Character 13 of Serial Number */
    0x00, /* 67—Character 14 of Serial Number */
    0x00, /* 68—Character 15 of Serial Number */
    0x00, /* 69—Character 16 of Serial Number */
    0x00, /* 70—Oil Seconds MSB */
    0x00, /* 71—Oil Seconds */
    0x00, /* 72—Oil Seconds */
    0x00, /* 73—Oil Seconds LSB */
    0x00, /* 74—Rotation Position */
    0x00, /* 75—Total Minutes MSB */
    0x00, /* 76—Total Minutes LSB */
    0x00, /* 77—Online Timer */
    0x00, /* 78—Active */
    0x00, /* 79—Operating */
    0x00, /* 80—Bypass */
    0x00, /* 81—Major Version Number */
    0x00, /* 82—Minor Version Number */
    0x00, /* 83—Upper Byte of CRC */
    0x00, /* 84—Lower Byte of CRC */
    0xFD /* 85—End Message */

In the above message, the COMPRESSOR STATE byte has the following possible codes and meanings:

0=STOPPED
1=STARTING
2=LOADED
3=UNLOADED
4=AUTO DUAL SHUTDOWN
5=SHUTDOWN
6=PROGRAMMED SHUTDOWN

In the above message, the SHUTDOWN STATE byte has the following possible codes and meanings:

0=Communication with the Relay Board has been lost
1=Contactor will not disengage
2=Stop button or HAT backup tripped
3=High discharge air temperature
4=High sump air pressure
5=Motor overload (either main or fan)
6=Discharge RTD disconnected, cannot monitor temperature
7=Sump RTD disconnected, cannot monitor temperature
8=Line Pressure transducer disconnected, cannot monitor pressure
9=Sump Pressure transducer disconnected, cannot monitor pressure
10=State Machine Error
11=Contactor will not engage
12=Rapid Restart of compressor (NOT USED)
13=Possible Reverse Rotation
14=Write error in EEPROM In the above messages, the COMPRESSOR MODE OF OPERATION byte has the following possible codes and meanings:

0=CONTINUOUS RUN
1=AUTO DUAL
2=NETWORK

In the above messages, the LOAD PRESSURE byte is the pressure that the compressor is set to run loaded at. An example of the LOAD PRESSURE value might be 6E, this is the HEX number for 110. So the load pressure would be 110 psig. The UNLOAD PRESSURE byte is the pressure that the compressor is set to unload at. Its value is in the same format as the load pressure. The LINE PRESSURE byte is the current pressure at the discharge of the compressor package checkvalve. It is represented in the same fashion as the LOAD PRESSURE byte. The SUMP PRESSURE byte is the current pressure at the sump or oil separator tank on the compressor package. It is represented in the same fashion as the LOAD PRESSURE byte. The DISCHARGE TEMP byte is the current temperature at the discharge of the compressor (airend) in Degrees F. This byte is converted in the same fashion as the pressures described above.

The SUMP TEMP byte is the current temperature of the sump or oil separator tank in Degrees F. This byte is converted in the same fashion as the pressures described above. The OIL FILTER SWITCH byte has the following possible codes and meanings.

0=BAD MAY BE A BAD SWITCH
1=GOOD
2=REPLACE FILTER

The INTAKE FILTER SWITCH byte has the following possible codes and meanings.

0=BAD MAY BE A BAD SWITCH
1=GOOD
2=REPLACE FILTER

The BYPASS VALVES byte has the following possible codes and meanings. Note this byte is only valid if the COMPRESSOR MODE byte is equal to 2.

0=Pointer passed left, Inlet closed, Lift Valves 1,2,3,4 open
1=Pointer passed left, Inlet open, Lift Valves 1,2,3,4 open
2=Pointer passing left, Inlet open, Lift Valves 1,2,3,4 open
3=Pointer at machine, inlet open, Lift Valves 1,2,3,4 open
4=Pointer at machine, inlet open, Lift Valves 1,2,3 open
5=Pointer at machine, inlet open, Lift Valves 1,2 open
6=Pointer at machine, inlet open, Lift Valves 1 open
7=Pointer at machine, inlet open, Lift Valves none open
8=Pointer passing right, inlet open, Lift Valves none open
9=Pointer passed right, inlet open, Lift Valves none open The MOTOR OVERLOAD byte has the following possible codes and meanings.

0=TRIPPED
1=GOOD

The MAIN MOTOR AUXILIARY byte has the following possible codes and meanings.

0=OPEN
1=CLOSED

AIR FILTER HOURS is calculated from four (4) bytes of data that represent seconds. This data has to be converted from ASCII to HEX and then shifted into the correct locations and then converted from seconds to hours.

Byte AIR FILTER SECONDS MSB
Byte AIR FILTER SECONDS
Byte AIR FILTER SECONDS
Byte AIR FILTER SECONDS LSB An example of AIR FILTER values might be the MSB=00, next byte=1B, next byte=98, and the LSB=9B. These are all HEX numbers and when placed together 001B989B. When converted to decimal it would be 1808539 seconds. When converted to hours it would be 1808539/3600=502.37 hours. The display would show 502 hours because it only displays whole hours.

OIL FILTER HOURS is calculated from four (4) bytes of data that represent seconds. This data has to be converted from ASCII to HEX and then shifted into the correct locations and then converted from seconds to hours, the same as AIR FILTER HOURS.

Byte LUBE FILTER SECONDS MSB
Byte LUBE FILTER SECONDS
Byte LUBE FILTER SECONDS
Byte LUBE FILTER SECONDS LSB SEPARATOR FILTER HOURS is calculated from four (4) bytes of data that represent seconds. This data has to be converted from ASCII to HEX and then shifted into the correct locations and then converted from seconds to hours, the same as AIR FILTER HOURS.

Byte SEPARATOR FILTER SECONDS MSB
Byte SEPARATOR FILTER SECONDS
Byte SEPARATOR FILTER SECONDS
Byte SEPARATOR FILTER SECONDS LSB LOADED HOURS is calculated from four (4) bytes of data that represent seconds. This data has to be converted from ASCII to HEX and then shifted into the correct location and then it can be converted from seconds to hours, the same as AIR FILTER HOURS.

Byte LOADED SECONDS MSB
Byte LOADED SECONDS
Byte LOADED SECONDS
Byte LOADED SECONDS LSB UNLOADED HOURS is calculated from four (4) bytes of data that represent seconds. This data has to be converted from ASCII to HEX and then shifted into the correct locations and then converted from seconds to hours, the same as AIR FILTER HOURS.

Byte UNLOADED SECONDS MSB
Byte UNLOADED SECONDS
Byte UNLOADED SECONDS
Byte UNLOADED SECONDS LSB The MACHINE MODEL byte has the following possible codes and meanings:

0=QSI 245
1=QSI 370
2=QSI 500
3=QSI 750
4=QSI 1000
5=QSI 1250
6=QSI 1500
7=QSI SPECIAL

The MACHINE CAPACITY byte has the following possible codes and meanings.

0=245 CFM
1=370 CFM
2=500 CFM
3=750 CFM
4=1000 CFM
5=1250 CFM
6=1500 CFM
7=SPECIAL CFM

The STARTER CONFIGURATION byte has the following possible codes and meanings:

0=Across-the-line Starter
1=Wye Delta Starter
2=Solid State Starter
3=Remote

The HORSEPOWER byte has the following possible codes and meanings:

0=7.5 H.P.
1=10 H.P.
2=15 H.P.
3=20 H.P.
4=25 H.P.
5=30 H.P.
6=40 H.P.
7=50 H.P.
8=60 H.P.
9=75 H.P.
10=100 H.P.
11=125 H.P.
12=150 H.P.
13=200 H.P.
14=250 H.P.
15=300 H.P.
16=350 H.P.

The MACHINE TYPE byte has the following possible codes and meanings:

0=Non-Lift Valve Machine */
1=Lift Valve Machine */

The AUTO-DUAL TIMER byte represents minutes and can be anything from one (1) to thirty (30). A 0 (zero) is not a valid number but a 0 (zero) could be returned if a request is made for a NODE NUMBER that does not exist or that is powered off.

The NODE NUMBER byte is a number from one (1) through sixteen (16) and should equal the number of the Destination Node you requested information from.

The DAM ROTATION TIME byte is the remaining time in hours until the next schedule change and would only be used if the compressors are running in network.

The BYPASSING ENABLED byte has the following possible codes and meanings:

0=FALSE
1=TRUE

The MODULATION ENABLED byte has the following possible codes and meanings:

0=FALSE
1=TRUE

The AUTO-DUAL TIMER VALUE byte would only be valid if the compressor is unloaded. This means that the COMPRESSOR STATE byte would have to be three (3). If this were the case, then the AUTO-DUAL TIMER VALUE byte represents the number of minutes left until the compressor will shutdown and go into a standby state.

The unit serial number is contained in the next sixteen (16) bytes. Each byte represents one digit or character of the serial number. The serial number is read left to right with character one (1) being the left most character. If the serial number is only six (6) characters long, then only character one (1) byte though the sixth (6th) byte will have values.

CHARACTER 1 OF SERIAL NUMBER
CHARACTER 2 OF SERIAL NUMBER
CHARACTER 3 OF SERIAL NUMBER
CHARACTER 4 OF SERIAL NUMBER
CHARACTER 5 OF SERIAL NUMBER
CHARACTER 6 OF SERIAL NUMBER
CHARACTER 7 OF SERIAL NUMBER
CHARACTER 8 OF SERIAL NUMBER
CHARACTER 9 OF SERIAL NUMBER
CHARACTER 10 OF SERIAL NUMBER
CHARACTER 11 OF SERIAL NUMBER
CHARACTER 12 OF SERIAL NUMBER
CHARACTER 13 OF SERIAL NUMBER
CHARACTER 14 OF SERIAL NUMBER
CHARACTER 15 OF SERIAL NUMBER
CHARACTER 16 OF SERIAL NUMBER

OIL HOURS is calculated from four (4) bytes of data that represent seconds. This data has to be converted from ASCII to HEX and then shifted into the correct location and then converted from seconds to hours.

OIL SECONDS MSB
OIL SECONDS
OIL SECONDS
OIL SECONDS LSB

The ROTATION POSITION byte is valid only if the COMPRESSOR MODE OF OPERATION byte is equal to two (2) for NETWORK mode. The ROTATION POSITION byte represents the position of this compressor in the sequence. For example the NODE NUMBER might be three (3) but at this time the compressor is running in position one (1).

TOTAL MINUTES is calculated from two (2) bytes of data that represent minutes. This data has to be converted from ASCII to HEX and then shifted into the correct locations and then converted from minutes to hours. This is the 24 hour clock time of this compressor.

TOTAL MINUTES MSB
TOTAL MINUTES LSB

The ONLINE TIMER byte is an indication of the quality of the network communications and has the following meaning:

0=NO COMMUNICATIONS
1=BAD
2=BAD to POOR
3=POOR
4=ACCEPTABLE
5=GOOD

This information is only valid for machines networked together and running in network mode. The data may have to be evaluated by comparing it to previous data, so several requests will need to be made.

The ACTIVE byte has the following possible codes and meanings. Note this byte is only valid if the COMPRESSOR MODE OF OPERATION byte is equal to two (2).

0=NOT RUNNING AND IN NETWORK MODE
1=RUNNING AND IN NETWORK MODE

The OPERATING byte has the following possible codes and meanings. Note this byte is only valid if the COMPRESSOR MODE OF OPERATION byte is equal to two (2).

0=NOT RUNNING
1=RUNNING

The BYPASS byte has the following possible codes and meanings. Note this byte is only valid if the COMPRESSOR MODE OF OPERATION byte is not equal to two (2).

0=NO LIFT VALVES OPEN
1=1 LIFT VALVE OPEN
2=2 LIFT VALVES OPEN
3=3 LIFT VALVES OPEN
4=4 LIFT VALVES OPEN

The SOFTWARE VERSION NUMBER is obtained from the following two (2) bytes.

MAJOR VERSION NUMBER byte A decimal point goes after this number.
MINOR VERSION NUMBER byte.

Data Structure for a Block Read Request Message to the Electronic Control System This is the message that the modem communications software running on a PC 50 sends through the modem 40 over the phone lines 44 to the modem 32 on a compressor and then to the control board 30 itself in order to obtain information from the control board's EEPROM memory. This could be used to retrieve any of the data stored in the control board's EEPROM memory, but the modem communications program only uses this to retrieve shutdown logs from individual compressors at this time.

All of the individual bytes of the message have already been explained with the following exceptions. The Function Code is the real trigger for this message, it is a ten (10) and this always means that this is a request for reading a block of memory. The Subfunction Code is not used for this message and is always zero (0). The EEPROM Starting Address MSB and the EEPROM Starting Address LSB provide two bytes for a memory location in the EEPROM. The Byte Count MSB and Byte Count LSB provide the number of byte to read in the EEPROM memory. For the shutdown log information it is stored starting at memory location hex 100.

0x00, /* 0—Source Node */
0x00, /* 1—Destination Node */
0x00, /* 2—MSB of bytecount */
0x0A, /* 3—LSB of bytecount */
0xFE, /* 4—Start Message */
0x10, /* 5—Function Code */
0x00, /* 6—Subfunction Code */
0x00, /* 7—EEPROM Starting Address MSB */
0x00, /* 8—EEPROM Starting Address LSB */
0x00, /* 9—Byte Count MSB */
0x00, /* 10—Byte Count LSB */
0x00, /* 11—Upper Byte of CRC */
0x00, /* 12—Lower Byte of CRC */
0xFD /* 13—End Message */

Data Structure for a Block Read Reply Message from the Control Board

This is the message that the control board 30 sends through the modem 32 that it is connected to, over the phone lines 44 to the modem 40 connected to the PC 50 running the modem communications software. The bytes of the message up to the Function Code have already been explained. The Function Code for this message is eleven (11) and this identifies this message as containing the data from the block of memory read. The Subfunction Code has no meaning for this message and is zero (0). The EEPROM Starting Address MSB and EEPROM Starting Address LSB should be the same as those requested. The Byte Count should be the same as that requested and will indicate the number Possible Byte's in this message that contain useful information.

0x00, /* 0—Source Node */
0x00, /* 1—Destination Node */
0x00, /* 2—MSB of bytecount */
0x09, /* 3—LSB of bytecount */
0xFE, /* 4—Start Message */
0x10, /* 5—Function Code */
0x00, /* 6—Subfunction Code */
0x00, /* 7—EEPROM Starting Address MSB */
0x00, /* 8—EEPROM Starting Address LSB */
0x00, /* 9—Byte Count */
0x00, /* 10—Possible Byte 1 */
0x00, /* 11—Possible Byte 2 */
0x00, /* 12—Possible Byte 3 */
0x00, /* 13—Possible Byte 4 */
0x00, /* 14—Possible Byte 5 */
0x00, /* 15—Possible Byte 6 */
0x00, /* 16—Possible Byte 7 */
0x00, /* 17—Possible Byte 8 */
0x00, /* 18—Possible Byte 9 */
0x00, /* 19—Possible Byte 10 */
0x00, /* 20—Possible Byte 11 */
0x00, /* 21—Possible Byte 12 */
0x00, /* 22—Possible Byte 13 */

```
0x00, /* 23—Possible Byte 14 */
0x00, /* 24—Possible Byte 15 */
0x00, /* 25—Possible Byte 16 */
0x00, /* 26—Possible Byte 17 */
0x00, /* 27—Possible Byte 18 */
0x00, /* 28—Possible Byte 19 */
0x00, /* 29—Possible Byte 20 */
0x00, /* 30—Possible Byte 21 */
0x00, /* 31—Possible Byte 22 */
0x00, /* 32—Possible Byte 23 */
0x00, /* 33—Possible Byte 24 */
0x00, /* 34—Possible Byte 25 */
0x00, /* 35—Possible Byte 26 */
0x00, /* 36—Possible Byte 27 */
0x00, /* 37—Possible Byte 28 */
0x00, /* 38—Possible Byte 29 */
0x00, /* 39—Possible Byte 30 */
0x00, /* 40—Possible Byte 31 */
0x00, /* 41—Possible Byte 32 */
0x00, /* 42—Possible Byte 33 */
0x00, /* 43—Possible Byte 34 */
0x00, /* 44—Possible Byte 35 */
0x00, /* 45—Possible Byte 36 */
0x00, /* 46—Possible Byte 37 */
0x00, /* 47—Possible Byte 38 */
0x00, /* 48—Possible Byte 39 */
0x00, /* 49—Possible Byte 40 */
0x00, /* 50—Possible Byte 41 */
0x00, /* 51—Possible Byte 42 */
0x00, /* 52—Possible Byte 43 */
0x00, /* 53—Possible Byte 44 */
0x00, /* 54—Possible Byte 45 */
0x00, /* 55—Possible Byte 46 */
0x00, /* 56—Possible Byte 47 */
0x00, /* 57—Possible Byte 48 */
0x00, /* 58—Possible Byte 49 */
0x00, /* 59—Possible Byte 50 */
0x00, /* 60—Possible Byte 51 */
0x00, /* 61—Possible Byte 52 */
0x00, /* 62—Possible Byte 53 */
0x00, /* 63—Possible Byte 54 */
0x00, /* 64—Possible Byte 55 */
0x00, /* 65—Possible Byte 56 */
0x00, /* 66—Possible Byte 57 */
0x00, /* 67—Possible Byte 58 */
0x00, /* 68—Possible Byte 59 */
0x00, /* 69—Possible Byte 60 */
0x00, /* 70—Possible Byte 61 */
0x00, /* 71—Possible Byte 62 */
0x00, /* 72—Possible Byte 63 */
0x00, /* 73—Possible Byte 64 */
0x00, /* 74—Possible Upper Byte of CRC */
0x00, /* 75—Possible Lower Byte of CRC */
0x00 /* 76—Possible End Message */
```

The possible shutdown codes that can be contained in the Possible Byte 's is as follows:

0x01=HIGH AIR TEMPERATURE SHUTDOWN
0x02=HIGH AIR PRESSURE
0x03=MOTOR OVERLOAD
0x14=SUMP TRANSDUCER FAILURE
0x15=LINE TRANSDUCER FAILURE
0x16=SUMP TEMPERATURE PROBE FAILURE
0x17=DISCHARGE TEMPERATURE PROBE FAILURE
0x19=AIR FILTER INDICATOR
0x1A=OIL FILTER INDICATOR
0x1B=SEPARATOR INDICATOR
0x21=CONTACTOR WELDED
0x22=CONTACTOR FAULTY
0x23=COMMUNICATION FAILURE
0x25=EMERGENCY STOP BUTTON PRESSED
0x26=REVERSE ROTATION

Data Structure for a Sequence Request Message to the Control Board

This is the message that the modem communications software running on a PC 50 sends through the modem 40 over the phone lines 44 to the modem 32 on a compressor 22 and then to the control board 30 itself in order to obtain the sequence information that has been programmed into the control.

All of the individual bytes of the message have already been explained with the following exceptions. The Function Code is the real trigger for this message, it is a 0C and this always means that this is a request for the sequence information. The Subfunction Code is not used for this message and is always zero (0).

```
0x00, /* 0—Source Node */
0x00, /* 1—Destination Node */
0x00, /* 2—MSB of bytecount */
0x00, /* 3—LSB of bytecount */
0xFE, /* 4—Start Message */
0x0C, /* 5—Function Code */
0x00, /* 6—Subfunction Code */
0x00, /* 7—Upper Byte of CRC */
0x00, /* 8—Lower Byte of CRC */
0xFD  /* 9—End Message */
```

Data Structure for a Sequence Reply Message from the Control Board

This is the message that the POWER$YNC Board 30 sends through the modem 32 that it is connected to, over the phone lines 44 to the modem 40 connected to the PC 50 running the modem communications software. The bytes of the message up to the Function Code have already been explained. The Function Code for this message is 0D and this identifies this message as containing the sequence information from the requested compressor. The Subfunction Code has no meaning for this message and is zero (0).

There are nine possible sequences with each sequence containing sixteen possible Node Numbers. The data in the Sequence n Position n byte locations will be a Node Number from zero (0) to sixteen (16), where zero (0) means the position is empty.

```
0x00, /* 0—Source Node */
0x00, /* 1—Destination Node */
0x00, /* 2—MSB of bytecount */
0x96, /* 3—LSB of bytecount */
```

0xFE, /* 4—Start Message */
0x0D, /* 5—Function Code */
0x00, /* 6—Subfunction Code */
0x00, /* 7—Sequence 1 Position 1 */
0x00, /* 8—Sequence 1 Position 2 */
0x00, /* 9—Sequence 1 Position 3 */
0x00, /* 10—Sequence 1 Position 4 */
0x00, /* 11—Sequence 1 PositionS */
0x00, /* 12—Sequence 1 Position 6 */
0x00, /* 13—Sequence 1 Position 7 */
0x00, /* 14—Sequence 1 Position 8 */
0x00, /* 15—Sequence 1 Position 9 */
0x00, /* 16—Sequence 1 Position 10 */
0x00, /* 17—Sequence 1 Position 11 */
0x00, /* 18—Sequence 1 Position 12 */
0x00, /* 19—Sequence 1 Position 13 */
0x00, /* 20—Sequence 1 Position 14 */
0x00, /* 21—Sequence 1 Position 15 */
0x00, /* 22—Sequence 1 Position 16 */
0x00, /* 23—Sequence 2 Position 1 */
0x00, /* 24—Sequence 2 Position 2 */
0x00, /* 25—Sequence 2 Position 3 */
0x00, /* 26—Sequence 2 Position 4 */
0x00, /* 27—Sequence 2 Position 5 */
0x00, /* 28—Sequence 2 Position 6 */
0x00, /* 29—Sequence 2 Position 7 */
0x00, /* 30—Sequence 2 Position 8 */
0x00, /* 31—Sequence 2 Position 9 */
0x00, /* 32—Sequence 2 Position 10 */
0x00, /* 33—Sequence 2 Position 11 */
0x00, /* 34—Sequence 2 Position 12 */
0x00, /* 35—Sequence 2 Position 13 */
0x00, /* 36—Sequence 2 Position 14 */
0x00, /* 37—Sequence 2 Position 15 */
0x00, /* 38—Sequence 2 Position 16 */
0x00, /* 39—Sequence 3 Position 1 */
0x00, /* 40—Sequence 3 Position 2 */
0x00, /* 41—Sequence 3 Position 3 */
0x00, /* 42—Sequence 3 Position 4 */
0x00, /* 43—Sequence 3 Position 5 */
0x00, /* 44—Sequence 3 Position 6 */
0x00, /* 45—Sequence 3 Position 7 */
0x00, /* 46—Sequence 3 Position 8 */
0x00, /* 47—Sequence 3 Position 9 */
0x00, /* 48—Sequence 3 Position 10 */
0x00, /* 49—Sequence 3 Position 11 */
0x00, /* 50—Sequence 3 Position 12 */
0x00, /* 51—Sequence 3 Position 13 */
0x00, /* 52—Sequence 3 Position 14 */
0x00, /* 53—Sequence 3 Position 15 */
0x00, /* 54—Sequence 3 Position 16 */
0x00, /* 55—Sequence 4 Position 1 */
0x00, /* 56—Sequence 4 Position 2 */
0x00, /* 57—Sequence 4 Position 3 */
0x00, /* 58—Sequence 4 Position 4 */
0x00, /* 59—Sequence 4 Position 5 */
0x00, /* 60—Sequence 4 Position 6 */
0x00, /* 61—Sequence 4 Position 7 */
0x00, /* 62—Sequence 4 Position 8 */
0x00, /* 63—Sequence 4 Position 9 */
0x00, /* 64—Sequence 4 Position 10 */
0x00, /* 65—Sequence 4 Position 11 */
0x00, /* 66—Sequence 4 Position 12 */
0x00, /* 67—Sequence 4 Position 13 */
0x00, /* 68—Sequence 4 Position 14 */
0x00, /* 69—Sequence 4 Position 15 */
0x00, /* 70—Sequence 4 Position 16 */
0x00, /* 71—Sequence 5 Position 1 */
0x00, /* 72—Sequence 5 Position 2 */
0x00, /* 73—Sequence 5 Position 3 */
0x00, /* 74—Sequence 5 Position 4 */
0x00, /* 75—Sequence 5 Position 5 */
0x00, /* 76—Sequence 5 Position 6 */
0x00, /* 77—Sequence 5 Position 7 */
0x00, /* 78—Sequence 5 Position 8 */
0x00, /* 79—Sequence 5 Position 9 */
0x00, /* 80—Sequence 5 Position 10 */
0x00, /* 81—Sequence 5 Position 11 */
0x00, /* 82—Sequence 5 Position 12 */
0x00, /* 83—Sequence 5 Position 13 */
0x00, /* 84—Sequence 5 Position 14 */
0x00, /* 85—Sequence 5 Position 15 */
0x00, /* 86—Sequence 5 Position 16 */
0x00, /* 87—Sequence 6 Position 1 */
0x00, /* 88—Sequence 6 Position 2 */
0x00, /* 89—Sequence 6 Position 3 */
0x00, /* 90—Sequence 6 Position 4 */
0x00, /* 91—Sequence 6 Position 5 */
0x00, /* 92—Sequence 6 Position 6 */
0x00, /* 93—Sequence 6 Position 7 */
0x00, /* 94—Sequence 6 Position 8 */
0x00, /* 95—Sequence 6 Position 9 */
0x00, /* 96—Sequence 6 Position 10 */
0x00, /* 97—Sequence 6 Position 11 */
0x00, /* 98—Sequence 6 Position 12 */
0x00, /* 99—Sequence 6 Position 13 */
0x00, /* 100—Sequence 6 Position 14 */
0x00, /* 101—Sequence 6 Position 15 */
0x00, /* 102—Sequence 6 Position 16 */
0x00, /* 103—Sequence 7 Position 1 */
0x00, /* 104—Sequence 7 Position 2 */
0x00, /* 105—Sequence 7 Position 3 */
0x00, /* 106—Sequence 7 Position 4 */
0x00, /* 107—Sequence 7 Position 5 */
0x00, /* 108—Sequence 7 Position 6 */
0x00, /* 109—Sequence 7 Position 7 */
0x00, /* 110—Sequence 7 Position 8 */
0x00, /* 111—Sequence 7 Position 9 */
0x00, /* 112—Sequence 7 Position 1 */
0x00, /* 113—Sequence 7 Position 11 */
0x00, /* 114—Sequence 7 Position 12 */
0x00, /* 115—Sequence 7 Position 13 */

0x00, /* 116—Sequence 7 Position 14 */
0x00, /* 117—Sequence 7 Position 15 */
0x00, /* 118—Sequence 7 Position 16 */
0x00, /* 119—Sequence 8 Position 1 */
0x00, /* 120—Sequence 8 Position 2 */
0x00, /* 121—Sequence 8 Position 3 */
0x00, /* 122—Sequence 8 Position 4 */
0x00, /* 123—Sequence 8 Position 5 */
0x00, /* 124—Sequence 8 Position 6 */
0x00, /* 125—Sequence 8 Position 7 */
0x00, /* 126—Sequence 8 Position 8 */
0x00, /* 127—Sequence 8 Position 9 */
0x00, /* 128—Sequence 8 Position 10 */
0x00, /* 129—Sequence 8 Position 11 */
0x00, /* 130—Sequence 8 Position 12 */
0x00, /* 131—Sequence 8 Position 13 */
0x00, /* 132—Sequence 8 Position 14 */
0x00, /* 133—Sequence 8 Position 15 */
0x00, /* 134—Sequence 8 Position 16 */
0x00, /* 135—Sequence 9 Position 1 */
0x00, /* 136—Sequence 9 Position 2 */
0x00, /* 137—Sequence 9 Position 3 */
0x00, /* 138—Sequence 9 Position 4 */
0x00, /* 139—Sequence 9 Position 5 */
0x00, /* 140—Sequence 9 Position 6 */
0x00, /* 141—Sequence 9 Position 7 */
0x00, /* 142—Sequence 9 Position 8 */
0x00, /* 143—Sequence 9 Position 9 */
0x00, /* 144—Sequence 9 Position 10 */
0x00, /* 145—Sequence 9 Position 11 */
0x00, /* 146—Sequence 9 Position 12 */
0x00, /* 147—Sequence 9 Position 13 */
0x00, /* 148—Sequence 9 Position 14 */
0x00, /* 149—Sequence 9 Position 15 */
0x00, /* 150—Sequence 9 Position 16 */
0x00, /* 151—Upper Byte of CRC */
0x00, /* 152—Lower Byte of CRC */
0xFD /* 153—End Message */

Data Structure for a Schedule Request Message to the Control Board

This is the message that the modem communications software running on a PC 50 sends through the modem 40 over the phone lines 44 to the modem 32 on a compressor 22 and then to the control board 30 itself in order to obtain the sequence information that has been programmed into the control board 30.

All of the individual bytes of the message have already been explained with the following exceptions. The Function Code is the real trigger for this message, it is a 0E and this always means that this is a request for the schedule information. The Subfunction Code is not used for this message and is always zero.

0x00, /* 0—Source Node */
0x00, /* 1—Destination Node */
0x00, /* 2—MSB of bytecount */
0x06, /* 3—LSB of bytecount */
0xFE, /* 4—Start Message */
0x0E, /* 5—Function Code */
0x00, /* 6—Subfunction Code */
0x00, /* 7—Upper Byte of CRC */
0x00, /* 8—Lower Byte of CRC */
0xFD /* 9—End Message */

Data Structure for a Schedule Reply Message from the Control Board

This is the message that the control board 30 sends through the modem 32 that it is connected to, over the phone lines 44 to the modem 40 connected to the PC 50 running the modem communications software. The bytes of the message up to the Function Code have already been explained. The Function Code for this message is 0F and this identifies this message as containing the schedule information from the requested compressor. The Subfunction Code has no meaning for this message and is zero (0).

There are seven (7) possible days with each day containing nine (9) possible shift times and sequence numbers. Holiday are not used at this time so the data contained in these bytes is of no use. The shift time is contained in two (2) bytes and is representative of a twenty four (24) hour clock value in minutes. The sequence number can be anything from one (1) to nine (9) and is representative of the programmed sequences.

0x00, /* 0—Source Node */
0x00, /* 1—Destination Node */
0x00, /* 2—MSB of bytecount */
0xF9, /* 3—LSB of bytecount */
0xFE, /* 4—Start Message */
0x0F, /* 5—Function Code */
0X00, /* 6—Subfunction Code */
0x00, /* 7—Sunday Time 1 Shift Time (MSB) */
0x00, /* 8—Sunday Time 1 Shift Time (LSB) */
0x00, /* 9—Sunday Time 1 Sequence Number */
0x00, /* 10—Sunday Time 2 Shift Time (MSB) */
0x00, /* 11—Sunday Time 2 Shift Time (LSB) */
0x00, /* 12—Sunday Time 2 Sequence Number */
0x00, /* 13—Sunday Time 3 Shift Time (MSB) */
0x00, /* 14—Sunday Time 3 Shift Time (LSB) */
0x00, /* 15—Sunday Time 3 Sequence Number */
0x00, /* 16—Sunday Time 4 Shift Time (MSB) */
0x00, /* 17—Sunday Time 4 Shift Time (LSB) */
0x00, /* 18—Sunday Time 4 Sequence Number */
0x00, /* 19—Sunday Time 5 Shift Time (MSB) */
0x00, /* 20—Sunday Time 5 Shift Time (LSB) */
0x00, /* 21—Sunday Time 5 Sequence Number */
0x00, /* 22—Sunday Time 6 Shift Time (MSB) */
0x00, /* 23—Sunday Time 6 Shift Time (LSB) */
0x00, /* 24—Sunday Time 6 Sequence Number */
0x00, /* 25—Sunday Time 7 Shift Time (MSB) */
0x00, /* 26—Sunday Time 7 Shift Time (LSB) */
0x00, /* 27—Sunday Time 7 Sequence Number */
0x00, /* 28—Sunday Time 8 Shift Time (MSB) */
0x00, /* 39—Sunday Time 8 Shift Time (LSB) */
0x00, /* 30—Sunday Time 8 Sequence Number */
0x00, /* 31—Sunday Time 9 Shift Time (MSB) */
0x00, /* 32—Sunday Time 9 Shift Time (LSB) */
0x00, /* 33—Sunday Time 9 Sequence Number */
0x00, /* 34—Monday Time 1 Shift Time (MSB) */
0x00, /* 35—Monday Time 1 Shift Time (LSB) */
0x00, /* 36—Monday Time 1 Sequence Number */
0x00, /* 37—Monday Time 2 Shift Time (MSB) */

0x00, /* 38—Monday Time 2 Shift Time (LSB) */
0x00, /* 49—Monday Time 2 Sequence Number */
0x00, /* 40—Monday Time 3 Shift Time (MSB) */
0x00, /* 41—Monday Time 3 Shift Time (LSB) */
0x00, /* 42—Monday Time 3 Sequence Number */
0x00, /* 43—Monday Time 4 Shift Time (MSB) */
0x00, /* 44—Monday Time 4 Shift Time (LSB) */
0x00, /* 45—Monday Time 4 Sequence Number */
0x00, /* 46—Monday Time 5 Shift Time (MSB) */
0x00, /* 47—Monday Time 5 Shift Time (LSB) */
0x00, /* 48—Monday Time 5 Sequence Number */
0x00, /* 59—Monday Time 6 Shift Time (MSB) */
0x00, /* 50—Monday Time 6 Shift Time (LSB) */
0x00, /* 51—Monday Time 6 Sequence Number */
0x00, /* 52—Monday Time 7 Shift Time (MSB) */
0x00, /* 53—Monday Time 7 Shift Time (LSB) */
0x00, /* 54—Monday Time 7 Sequence Number */
0x00, /* 55—Monday Time 8 Shift Time (MSB) */
0x00, /* 56—Monday Time 8 Shift Time (LSB) */
0x00, /* 57—Monday Time 8 Sequence Number */
0x00, /* 58—Monday Time 9 Shift Time (MSB) */
0x00, /* 69—Monday Time 9 Shift Time (LSB) */
0x00, /* 60—Monday Time 9 Sequence Number */
0x00, /* 61—Tuesday Time 1 Shift Time (MSB) */
0x00, /* 62—Tuesday Time 1 Shift Time (LSB) */
0x00, /* 63—Tuesday Time 1 Sequence Number */
0x00, /* 64—Tuesday Time 2 Shift Time (MSB) */
0x00, /* 65—Tuesday Time 2 Shift Time (LSB) */
0x00, /* 66—Tuesday Time 2 Sequence Number */
0x00, /* 67—Tuesday Time 3 Shift Time (MSB) */
0x00, /* 68—Tuesday Time 3 Shift Time (LSB) */
0x00, /* 79—Tuesday Time 3 Sequence Number */
0x00, /* 70—Tuesday Time 4 Shift Time (MSB) */
0x00, /* 71—Tuesday Time 4 Shift Time (LSB) */
0x00, /* 72—Tuesday Time 4 Sequence Number */
0x00, /* 73—Tuesday Time 5 Shift Time (MSB) */
0x00, /* 74—Tuesday Time 5 Shift Time (LSB) */
0x00, /* 75—Tuesday Time 5 Sequence Number */
0x00, /* 76—Tuesday Time 6 Shift Time (MSB) */
0x00, /* 77—Tuesday Time 6 Shift Time (LSB) */
0x00, /* 78—Tuesday Time 6 Sequence Number */
0x00, /* 89—Tuesday Time 7 Shift Time (MSB) */
0x00, /* 80—Tuesday Time 7 Shift Time (LSB) */
0x00, /* 81—Tuesday Time 7 Sequence Number */
0x00, /* 82—Tuesday Time 8 Shift Time (MSB)*/
0x00, /* 83—Tuesday Time 8 Shift Time (LSB) */
0x00, /* 84—Tuesday Time 8 Sequence Number */
0x00, /* 85—Tuesday Time 9 Shift Time (MSB) */
0x00, /* 86—Tuesday Time 9 Shift Time (LSB) */
0x00, /* 87—Tuesday Time 9 Sequence Number*/
0x00, /* 88—Wednesday Time 1 Shift Time (MSB) */
0x00, /* 99—Wednesday Time 1 Shift Time (LSB) */
0x00, /* 90—Wednesday Time 1 Sequence Number */
0x00, /* 91—Wednesday Time 2 Shift Time (MSB) */
0x00, /* 92—Wednesday Time 2 Shift Time (LSB) */
0x00, /* 93—Wednesday Time 2 Sequence Number */
0x00, /* 94—Wednesday Time 3 Shift Time (MSB) */
0x00, /* 95—Wednesday Time 3 Shift Time (LSB) */
0x00, /* 96—Wednesday Time 3 Sequence Number */
0x00, /* 97—Wednesday Time 4 Shift Time (MSB) */
0x00, /* 98—Wednesday Time 4 Shift Time (LSB) */
0x00, /* 99—Wednesday Time 4 Sequence Number */
0x00, /* 100—Wednesday Time 5 Shift Time (SB) */
0x00, /* 101—Wednesday Time 5 Shift Time (LSB) */
0x00, /* 102—Wednesday Time 5 Sequence Number */
0x00, /* 103—Wednesday Time 6 Shift Time (MSB) */
0x00, /* 104—Wednesday Time 6 Shift Time (LSB) */
0x00, /* 105—Wednesday Time 6 Sequence Number */
0x00, /* 106—Wednesday Time 7 Shift Time (MSB) */
0x00, /* 107—Wednesday Time 7 Shift Time (LSB) */
0x00, /* 108—Wednesday Time 7 Sequence Number */
0x00, /* 109—Wednesday Time 8 Shift Time (MSB) */
0x00, /* 110—Wednesday Time 8 Shift Time (LSB) */
0x00, /* 111—Wednesday Time 8 Sequence Number */
0x00, /* 112—Wednesday Time 9 Shift Time (MSB) */
0x00, /* 113—Wednesday Time 9 Shift Time (LSB) */
0x00, /* 114—Wednesday Time 9 Sequence Number */
0x00, /* 115—Thursday Time 1 Shift Time (MSB) */
0x00, /* 116—Thursday Time 1 Shift Time (LSB) */
0x00, /* 117—Thursday Time 1 Sequence Number */
0x00, /* 118—Thursday Time 2 Shift Time (MSB) */
0x00, /* 119—Thursday Time 2 Shift Time (LSB) */
0x00, /* 120—Thursday Time 2 Sequence Number */
0x00, /* 121—Thursday Time 3 Shift Time (MSB) */
0x00, /* 122—Thursday Time 3 Shift Time (LSB) */
0x00, /* 123—Thursday Time 3 Sequence Number */
0x00, /* 124—Thursday Time 4 Shift Time (MSB) */
0x00, /* 125—Thursday Time 4 Shift Time (LSB) */
0x00, /* 126—Thursday Time 4 Sequence Number */
0x00, /* 127—Thursday Time 5 Shift Time (MSB) */
0x00, /* 128—Thursday Time 5 Shift Time (LSB) */
0x00, /* 139—Thursday Time 5 Sequence Number */
0x00, /* 130—Thursday Time 6 Shift Time (MSB) */
0x00, /* 131—Thursday Time 6 Shift Time (LSB) */
0x00, /* 132—Thursday Time 6 Sequence Number */
0x00, /* 133—Thursday Time 7 Shift Time (MSB) */
0x00, /* 134—Thursday Time 7 Shift Time (LSB) */
0x00, /* 135—Thursday Time 7 Sequence Number */
0x00, /* 136—Thursday Time 8 Shift Time (MSB) */
0x00, /* 137—Thursday Time 8 Shift Time (LSB) */
0x00, /* 138—Thursday Time 8 Sequence Number */
0x00, /* 149—Thursday Time 9 Shift Time (MSB) */
0x00, /* 140—Thursday Time 9 Shift Time (LSB) */
0x00, /* 141—Thursday Time 9 Sequence Number */
0x00, /* 142—Friday Time 1 Shift Time (MSB) */
0x00, /* 143—Friday Time 1 Shift Time (LSB) */
0x00, /* 144—Friday Time 1 Sequence Number */
0x00, /* 145—Friday Time 2 Shift Time (MSB) */
0x00, /* 146—Friday Time 2 Shift Time (LSB) */
0x00, /* 147—Friday Time 2 Sequence Number */
0x00, /* 148—Friday Time 3 Shift Time (MSB) */
0x00, /* 149—Friday Time 3 Shift Time (LSB) */

```
0x00, /* 150—Friday Time 3 Sequence Number */
0x00, /* 151—Friday Time 4 Shift Time (MSB) */
0x00, /* 152—Friday Time 4 Shift Time (LSB) */
0x00, /* 153—Friday Time 4 Sequence Number */
0x00, /* 154—Friday Time 5 Shift Time (MSB) */
0x00, /* 155—Friday Time 5 Shift Time (LSB) */
0x00, /* 156—Friday Time 5 Sequence Number */
0x00, /* 157—Friday Time 6 Shift Time (MSB)*/
0x00, /* 158—Friday Time 6 Shift Time (LSB) */
0x00, /* 169—Friday Time 6 Sequence Number */
0x00, /* 160—Friday Time 7 Shift Time (MSB) */
0x00, /* 161—Friday Time 7 Shift Time (LSB) */
0x00, /* 162—Friday Time 7 Sequence Number */
0x00, /* 163—Friday Time 8 Shift Time (MSB) */
0x00, /* 164—Friday Time 8 Shift Time (LSB)*/
0x00, /* 165—Friday Time 8 Sequence Number */
0x00, /* 166—Friday Time 9 Shift Time (MSB)*/
0x00, /* 167—Friday Time 9 Shift Time (LSB)*/
0x00, /* 168—Friday Time 9 Sequence Number */
0x00, /* 179—Saturday Time 1 Shift Time (MSB)*/
0x00, /* 170—Saturday Time 1 Shift Time (LSB)*/
0x00, /* 171—Saturday Time 1 Sequence Number */
0x00, /* 172—Saturday Time 2 Shift Time (MSB)*/
0x00, /* 173—Saturday Time 2 Shift Time (LSB)*/
0x00, /* 174—Saturday Time 2 Sequence Number */
0x00, /* 175—Saturday Time 3 Shift Time (MSB)*/
0x00, /* 176—Saturday Time 3 Shift Time (LSB)*/
0x00, /* 177—Saturday Time 3 Sequence Number */
0x00, /* 178—Saturday Time 4 Shift Time (MSB)*/
0x00, /* 189—Saturday Time 4 Shift Time (LSB)*/
0x00, /* 180—Saturday Time 4 Sequence Number */
0x00, /* 181—Saturday Time 5 Shift Time (MSB)*/
0x00, /* 182—Saturday Time 5 Shift Time (LSB)*/
0x00, /* 183—Saturday Time 5 Sequence Number */
0x00, /* 184—Saturday Time 6 Shift Time (MSB)*/
0x00, /* 185—Saturday Time 6 Shift Time (LSB)*/
0x00, /* 186—Saturday Time 6 Sequence Number */
0x00, /* 187—Saturday Time 7 Shift Time (MSB)*/
0x00, /* 188—Saturday Time 7 Shift Time (LSB)*/
0x00, /* 199—Saturday Time 7 Sequence Number */
0x00, /* 190—Saturday Time 8 Shift Time (MSB)*/
0x00, /* 191—Saturday Time 8 Shift Time (LSB)*/
0x00, /* 192—Saturday Time 8 Sequence Number */
0x00, /* 193—Saturday Time 9 Shift Time (MSB)*/
0x00, /* 194—Saturday Time 9 Shift Time (LSB)*/
0x00, /* 195—Saturday Time 9 Sequence Number */
0x00, /* 196—Holiday 1 Time 1 Shift Time (MSB)*/
0x00, /* 197—Holiday 1 Time 1 Shift Time (LSB)*/
0x00, /* 198—Holiday 1 Time 1 Sequence Number */
0x00, /* 199—Holiday 1 Time 2 Shift Time (MSB)*/
0x00, /* 200—Holiday 1 Time 2 Shift Time (LSB)*/
0x00, /* 201—Holiday 1 Time 2 Sequence Number */
0x00, /* 202—Holiday 1 Time 3 Shift Time (MSB)*/
0x00, /* 203—Holiday 1 Time 3 Shift Time (LSB)*/
0x00, /* 204—Holiday 1 Time 3 Sequence Number */
0x00, /* 205—Holiday 1 Time 4 Shift Time (MSB)*/
0x00, /* 206—Holiday 1 Time 4 Shift Time (LSB)*/
0x00, /* 207—Holiday 1 Time 4 Sequence Number */
0x00, /* 208—Holiday 1 Time 5 Shift Time (MSB) */
0x00, /* 209—Holiday 1 Time 5 Shift Time (LSB) */
0x00, /* 210—Holiday 1 Time 5 Sequence Number */
0x00, /* 211—Holiday 1 Time 6 Shift Time (MSB) */
0x00, /* 212—Holiday 1 Time 6 Shift Time (LSB) */
0x00, /* 213—Holiday 1 Time 6 Sequence Number */
0x00, /* 214—Holiday 1 Time 7 Shift Time (MSB) */
0x00, /* 215—Holiday 1 Time 7 Shift Time (LSB) */
0x00, /* 216—Holiday 1 Time 7 Sequence Number */
0x00, /* 217—Holiday 1 Time 8 Shift Time (MSB) */
0x00, /* 218—Holiday 1 Time 8 Shift Time (LSB) */
0x00, /* 219—Holiday 1 Time 8 Sequence Number */
0x00, /* 220—Holiday 1 Time 9 Shift Time (MSB) */
0x00, /* 221—Holiday 1 Time 9 Shift Time (LSB) */
0x00, /* 222—Holiday 1 Time 9 Sequence Number */
0x00, /* 223—Holiday 2 Time 1 Shift Time (MSB) */
0x00, /* 224—Holiday 2 Time 1 Shift Time (LSB) */
0x00, /* 225—Holiday 2 Time 1 Sequence Number */
0x00, /* 226—Holiday 2 Time 2 Shift Time (MSB) */
0x00, /* 227—Holiday 2 Time 2 Shift Time (LSB) */
0x00, /* 228—Holiday 2 Time 2 Sequence Number */
0x00, /* 239—Holiday 2 Time 3 Shift Time (MSB) */
0x00, /* 230—Holiday 2 Time 3 Shift Time (LSB) */
0x00, /* 231—Holiday 2 Time 3 Sequence Number */
0x00, /* 232—Holiday 2 Time 4 Shift Time (MSB) */
0x00, /* 233—Holiday 2 Time 4 Shift Time (LSB) */
0x00, /* 234—Holiday 2 Time 4 Sequence Number */
0x00, /* 235—Holiday 2 Time 5 Shift Time (MSB) */
0x00, /* 236—Holiday 2 Time 5 Shift Time (LSB) */
0x00, /* 237—Holiday 2 Time 5 Sequence Number */
0x00, /* 238—Holiday 2 Time 6 Shift Time (MSB) */
0x00, /* 249—Holiday 2 Time 6 Shift Time (LSB) */
0x00, /* 240—Holiday 2 Time 6 Sequence Number */
0x00, /* 241—Holiday 2 Time 7 Shift Time (MSB) */
0x00, /* 242—Holiday 2 Time 7 Shift Time (LSB) */
0x00, /* 243—Holiday 2 Time 7 Sequence Number */
0x00, /* 244—Holiday 2 Time 8 Shift Time (MSB) */
0x00, /* 245—Holiday 2 Time 8 Shift Time (LSB) */
0x00, /* 246—Holiday 2 Time 8 Sequence Number */
0x00, /* 247—Holiday 2 Time 9 Shift Time (MSB) */
0x00, /* 248—Holiday 2 Time 9 Shift Time (LSB) */
0x00, /* 249—Holiday 2 Time 9 Sequence Number */
0x00, /* 250—Upper Byte of CRC */
0x00, /* 251—Lower Byte of CRC */
0xFD /* 252—End Message */
```

Additional information on the operation of the modem communications software used with the systems and methods of the present application is contained in the "Instruction Manual for Modem Communications" available from Quincy Compressor Division of Coltec Industries, Inc., Bay Minette, Ala., the disclosure of which is incorporated herein by reference.

As illustrated in FIGS. 3–18, flow charts are used to depict one representative embodiment of a modem communications software useful with the systems and methods of the present application. Such flow charts illustrate software useful for monitoring and controlling compressors. Such software is utilized to communicate instructions to the various compressors and to receive data from the various compressors including displaying various compressor parameters on a screen and storing the various compressor data in files in a PC at a remote location.

Once the modem communications software used with the present application has been loaded into the PC 50, shown in FIG. 1, the PC 50 can then access the modem communications software and initiate communications with the control board 30 at the remote compressor site 52.

Figure 3:
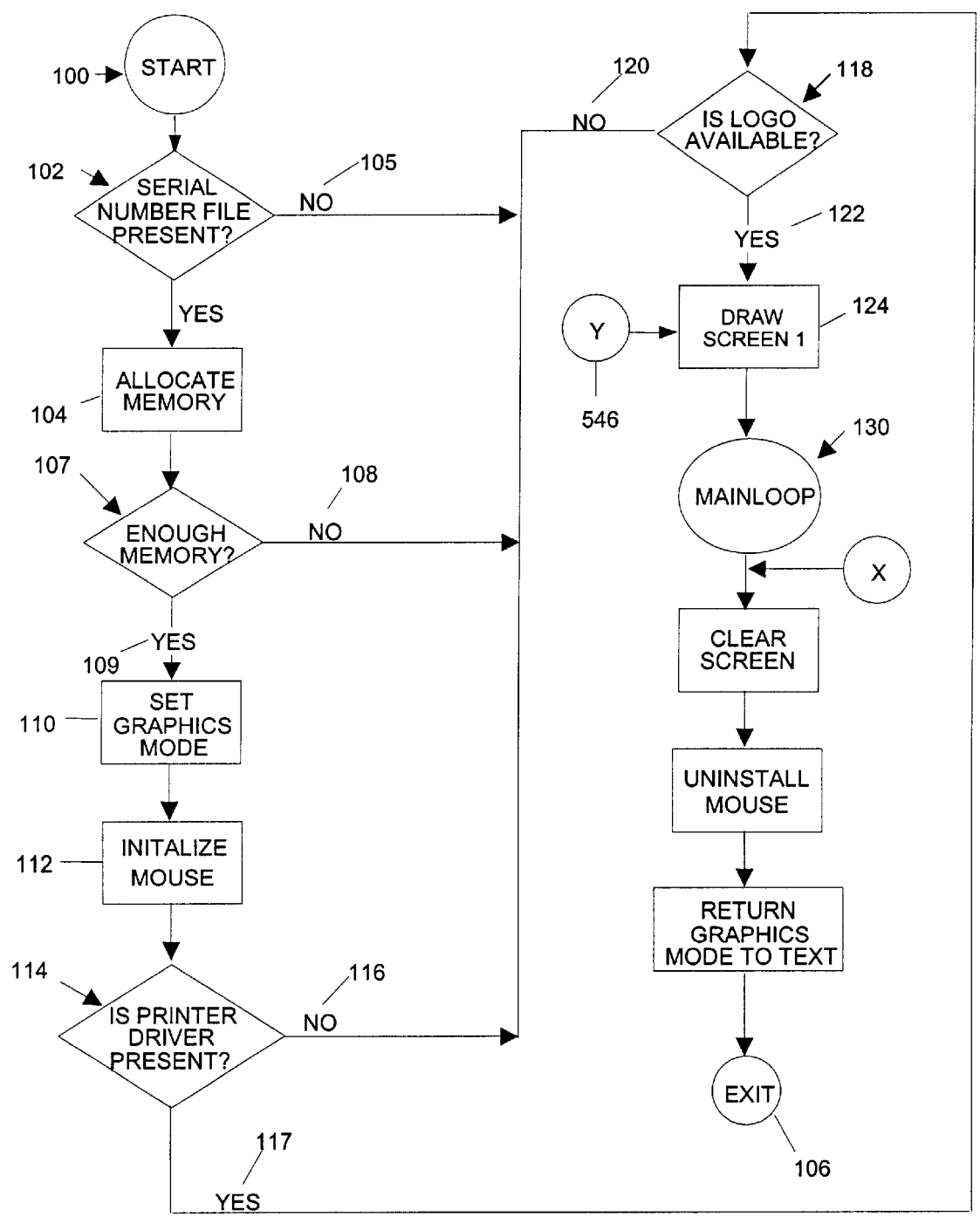
FIGS. 3–18 are flow charts illustrating the various operational routines of the modem communications software used with the systems and methods of the present invention.

As shown in FIG. 3, once the communications has been established between the PC 50 via modem 40, and modem 32 to the control board 30 located at compressor 22 of networked compressors 52 or single compressor 62, the modem communications software program is started at 100. After the program is started, the program checks for the presence of a list of authorized serial numbers for the compressors at 102. If the list of compressor serial numbers at the remote location 52 matches one of the serial numbers embedded in the modem communications software program, the program allocates sufficient PC memory to enable the program to function at 104. If no serial number of the compressor at the remote location matches a serial number embedded in the modem communications software program at 105, the program ends at 106.

Next, the modem communications software program checks to determine there is not enough memory available in the PC to allocate sufficient memory for the program needs at 107 if not at 108, the program ends at 106. If there is sufficient memory available within the modem communications software program at 109, the modem communications software sets the PC's display to a graphics mode at 110 and initializes the mouse at 112.

Next, the modem communications software program checks to see if a printer driver is present at 114. If there is no printer driver present at 116 the program ends at 106. If the printer driver is present at 117, the program checks to see if the Quincy Compressor logo is present in the introduction screen at 118. If the logo is not present at 120, the program ends at 106. If the logo is present at 122, the program displays the introduction screen on the PC monitor at 124. At this point, the program enters the main program loop at 130. This main loop is repeated until the program exits at 106.

Figure 4:
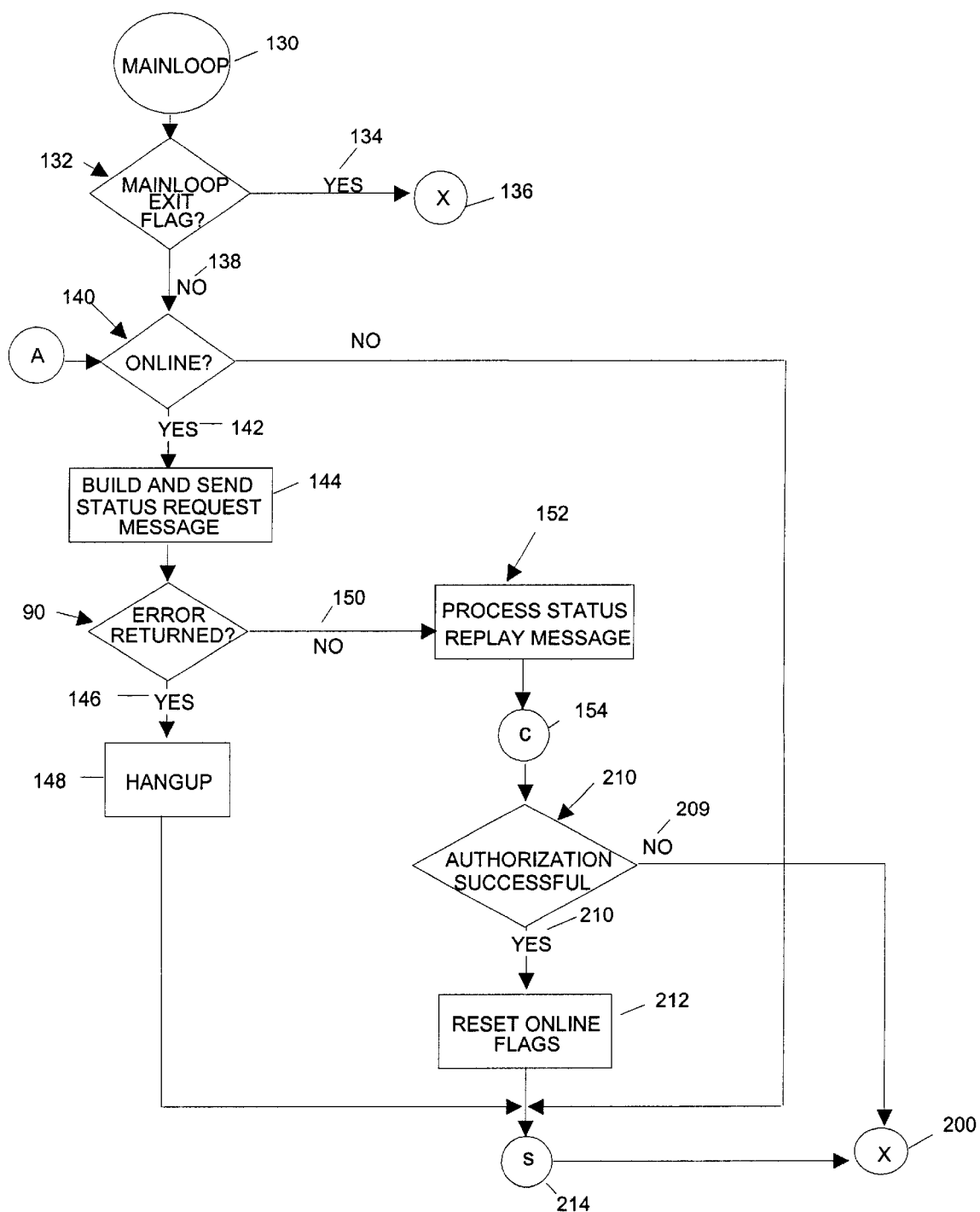

As shown in FIG. 4, upon entering the main loop 130, the modem communications software program checks to see if the main loop exit flag has been set at 132. The exit flag 132 can be set by pressing the escape key on the PC keyboard or by selecting exit from the file pulldown menu.

If the exit flag has been set at 134, the program exits at 136. If the exit flag has not been set at 138, the program checks to see if the PC 50 is online with the control board 30 at the remote location at 140. Specifically, the control software checks to see if there is an open phone line through the modem 40 that is in communication with the modem 32 or 60 at the remote location and that the modem communications software could send data to a control board 30 through modem 32. If the online status is positive at 142, the modem communications software sends a status request for information from each possible compressor in order to determine if there are any active compressors to retrieve information from at 144. If there are active compressors, the modem communications software updates the current list of active compressors. The returned information is the list of compressor node numbers that the modem communication software will use to retrieve data from a specific compressor.

The node number of the compressor is the number that is used in the destination node of the request messages sent to the control board 30.

If three (3) error messages are returned from the control board to the modem communications software or no response is returned from the remote location to the remote PC site at 146, the modem communication software will hang up the connection between the remote PC 50 and the modem 32 at the remote compressor site at 148. If at 150 no errors are returned or if there are valid responses to request messages, then the data in the reply messages is processed by the modem communications software at 152.

Figure 5:
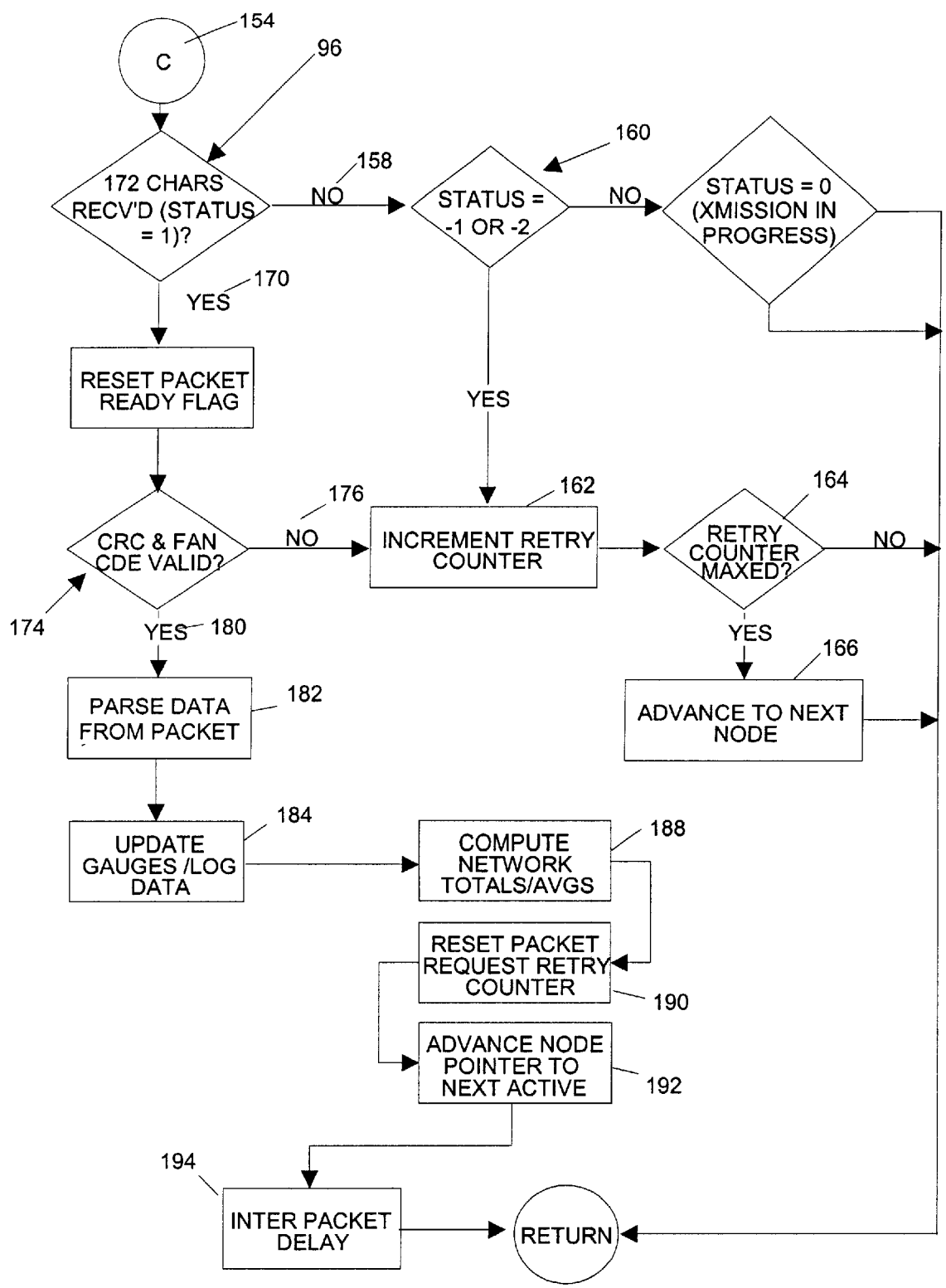

As shown in FIG. 5, once the modem communications software has processed the status reply message at 154, the modem communication software determines if the reply messages are valid by determining if one hundred seventy-two (172) characters had been received from the remote location at 156. One hundred and seventy-two (172) characters is the proper length of the data string from the status reply message which should be received from the control board 30 at the remote compressor. If there is not a one hundred seventy-two (172) character message returned at 158, it may mean that the compressor may have just gone inactive. If this is the case, then the modem communications software will attempt to verify that the compressor has gone inactive by attempting to receive data from the machine at least three (3) times at 160. At this point the retry counter is incremented at 162 and it is verified to be sure that it is not more than three (3) retries. If it is not more than three (3) retries, then the routine goes back to where it was called and the process is repeated. If the modem communication software has already tried three (3) times, the modem communications software advances to the next active node number of the compressor at the compressor location and this route goes back to where it was called and the process is repeated.

If the reply message had one hundred seventy-two (172) characters at 170, a second check for a valid message is made by checking the CRC number at 174. If the CRC number is not correct as contained in the message received from the compressor control board at the compressor location at 176, a total three (3) retries will be made in order to obtain the correct data at 162. If three (3) retries have already been made, then the modem communication software advances to the next active node number for the compressor and this routine goes back to where it was called and the process is repeated. If the message returned from the remote compressor was proper in all respects at 180, the data received from the compressor is broken down at 182 into its individual pieces and all the related variables and files in the modem communications software is updated at 184. The network totals are computed and averages are upgraded at 188. The retry counter is reset at 190 and the node number is advanced to the next active node number at 192.

At this time, a inter data packet delay is run at 194. This delay is to prevent overrunning any message queues in the modems of the control board 30 and the modem 32 for the control board 30. Then this routine goes back to where it was called and the process is repeated.

With reference now to FIG. 4, once the valid data has been collected from the control board 30, the modem communications software executes a security check. Since one of the components in the data contained in the status reply message is the serial number of the compressor that the particular control board 30 is controlling, the modem communications software compares the serial number of the compressor at teh control board to the list of authorized serial numbers embedded in the modem communications software. If the serial number of the compressor being communicated with is not on the list at 209, then the modem communications software exits at 200. If the serial number is a valid serial number at 210, then the online flags are reset at 212 and the modem communications software continues in its communications with the control board 30 at the remote compressor location at 214.

Figure 6:
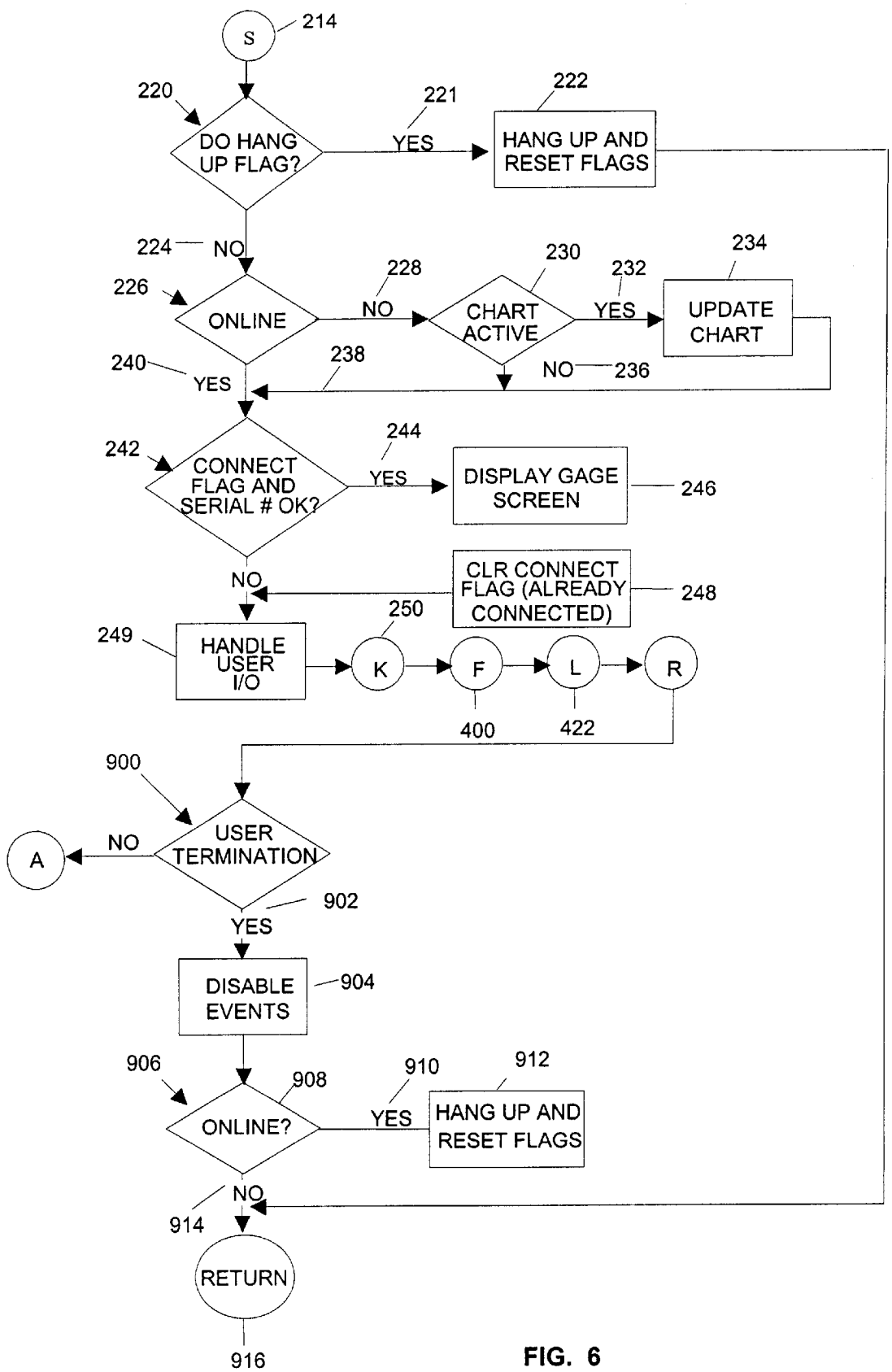

With reference now to FIG. 6, the modem communications software checks to see if the hangup flag has been set at 220. If the flag has been set at 221, the modem communications software hangs up the modem, resets the flag and returns to the location where this routine was called at 214 in FIG. 4 and then to 200.

If the hangup flag has not been set at 224, the modem communications software checks at 226 to see if the modem communications software is online and has a connection with the control board 30 at the remote compressor location. If the modem communications software is not online at 228, then the modem communications software checks to see if charting is active at 230 and if it is active at 232, the modem communications software updates the chart at 234. If the chart is not active at 236, the program continues on at 238. If the modem communications software is online at 240, then data from the compressors is being collected and cannot be charted while the modem communications software is online.

At 242, the modem communications software checks to see if the modem communications software is still connected through the modem 32 and if the serial number authorization is valid. If it is still connected and the serial number is valid at 244, the modem communications software then displays the gauge screen at 246 and clears the connect flag at 248. At this point, the modem communications software checks for any user input at 249, which would be mouse input, to select other screens to retrieve other data, to print the screen, or to hang up. User input is handled at 250.

Figure 7:
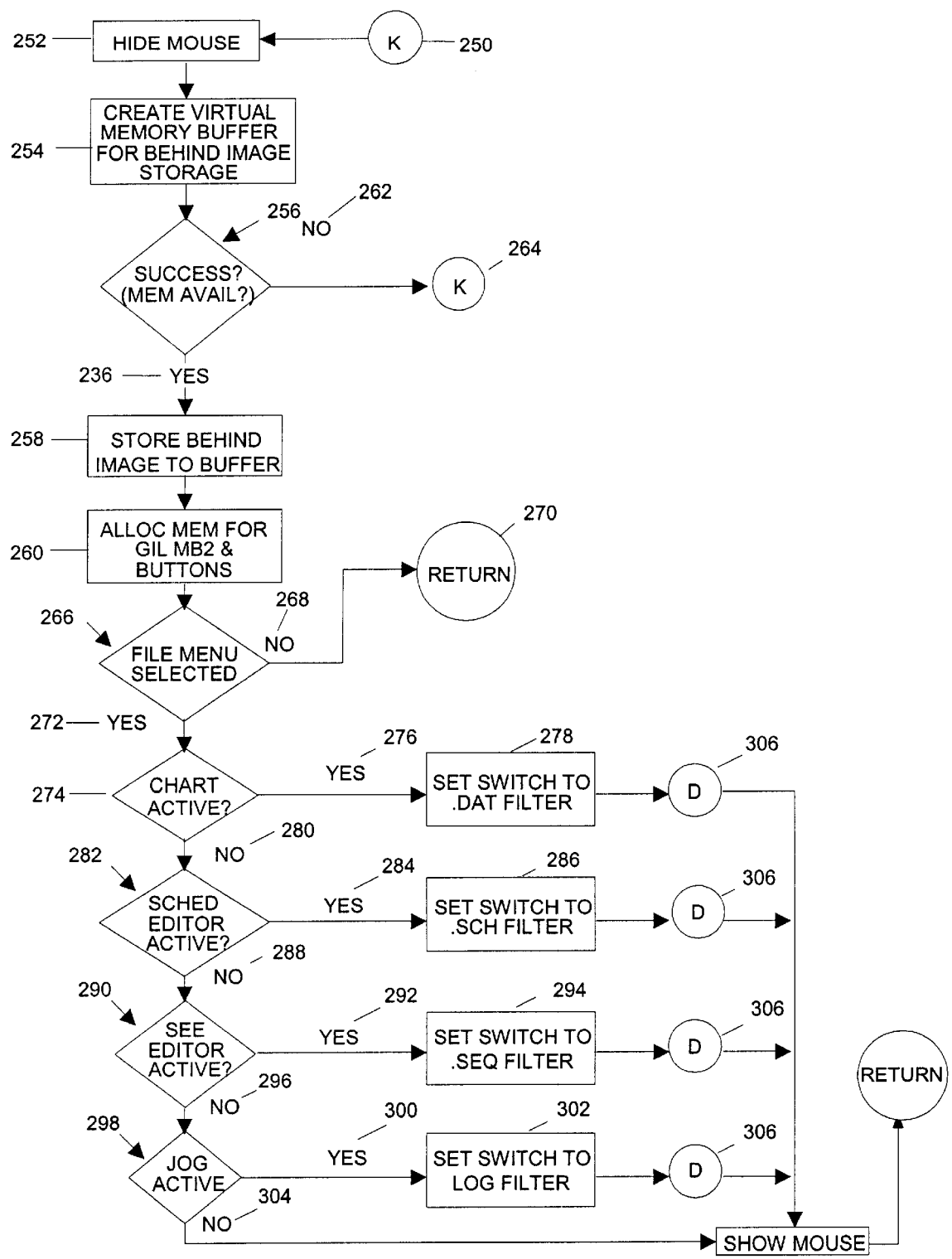

With reference now to FIG. 7, after user input 250, the mouse is hidden at 252 and a virtual memory buffer for behind image storing is created at 254. If there is sufficient memory available to create the virtual image storage at 256, then the graphics images, or behind image, are stored to the memory buffer at 258 and allocated memory for graphic instrumental library and associated screen buttons at 260. If sufficient memory was not available to create the virtual memory storage at 262, then the program exits at 264.

Once the memory for graphics instrument library and associated screen buttons has been allocated, the modem communications software checks to see if the file menu is selected at 266. If the file menu is not selected at 268, then the program returns to where this routine was called at 270.

If the file menu is selected at 272, the modem communications software checks to see if the chart screen is active at 274. If the chart screen is active at 276, then the file filter is set to data format at 278. If not at 280, the modem communications software checks to see if the schedule editor is active at 282. If the scheduler editor is active at 284, the file filter is set to the schedule format at 286.

Next, the modem communications software checks to see if the sequence editor is active at 290. If the sequence editor is active at 292, the file filter is set to the sequence filter at 294. If the sequence editor is not active at 296, the modem communications software checks to see if the log file 298 is active at 300. If the log file is active at 300, then the switch is set to log filter at 302. If the log file is not active at 304, then the modem communications software causes the mouse pointer to be shown and the software returns to where it was called at 250 in FIG. 6 and then to 400 If at any point where the said switch to the data filter was accomplished at 278, 286, 294 or 302, the modem communications software program then moves through a routine at 306.

Figure 8:
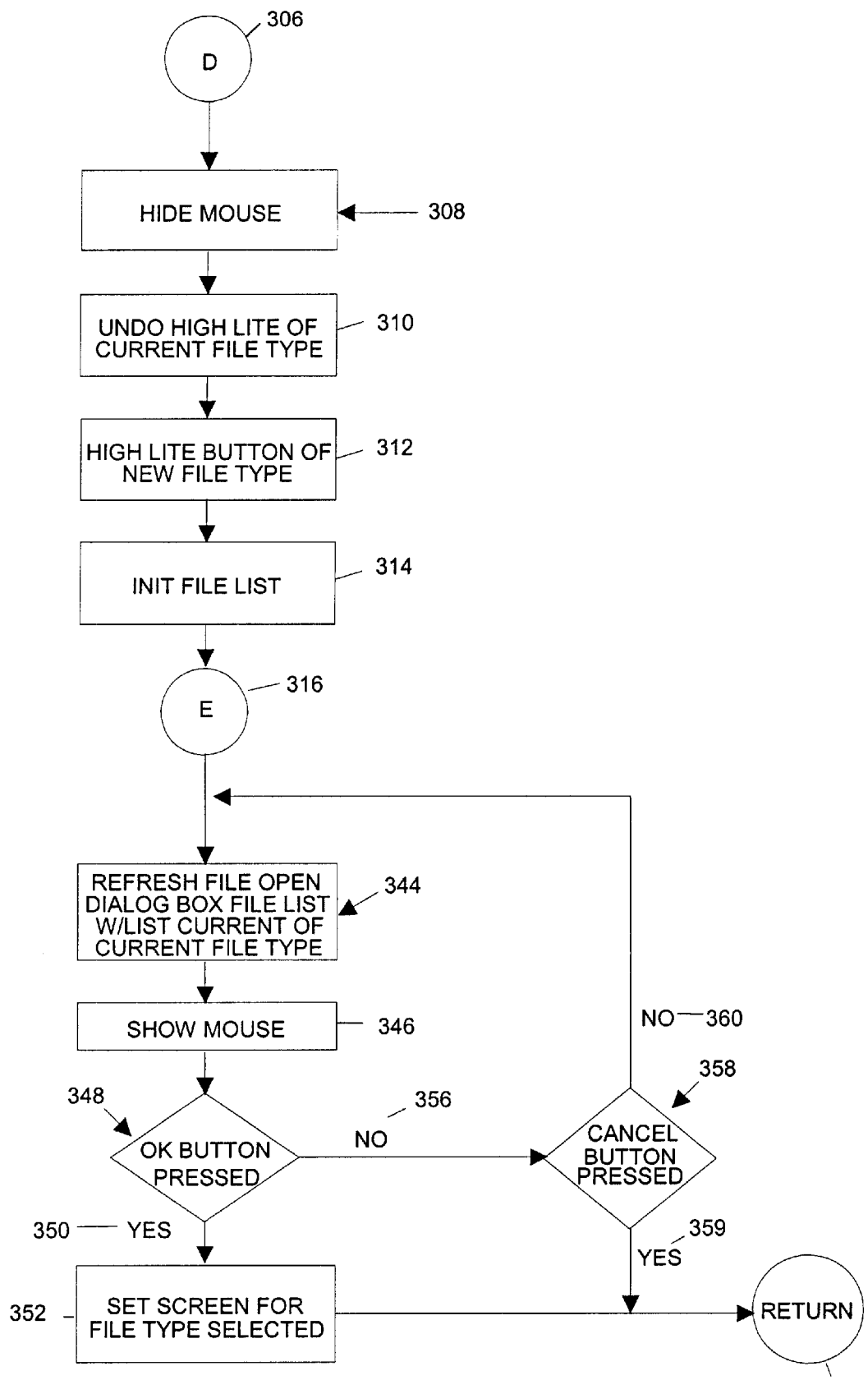

As illustrated in FIG. 8, routine 306 comprises the modem communications software hiding the mouse pointer at 308, moving the screen highlight of the current file type at 310, highlighting the newly selected file type at 312 and initializing the file list at 314.

Figure 9:
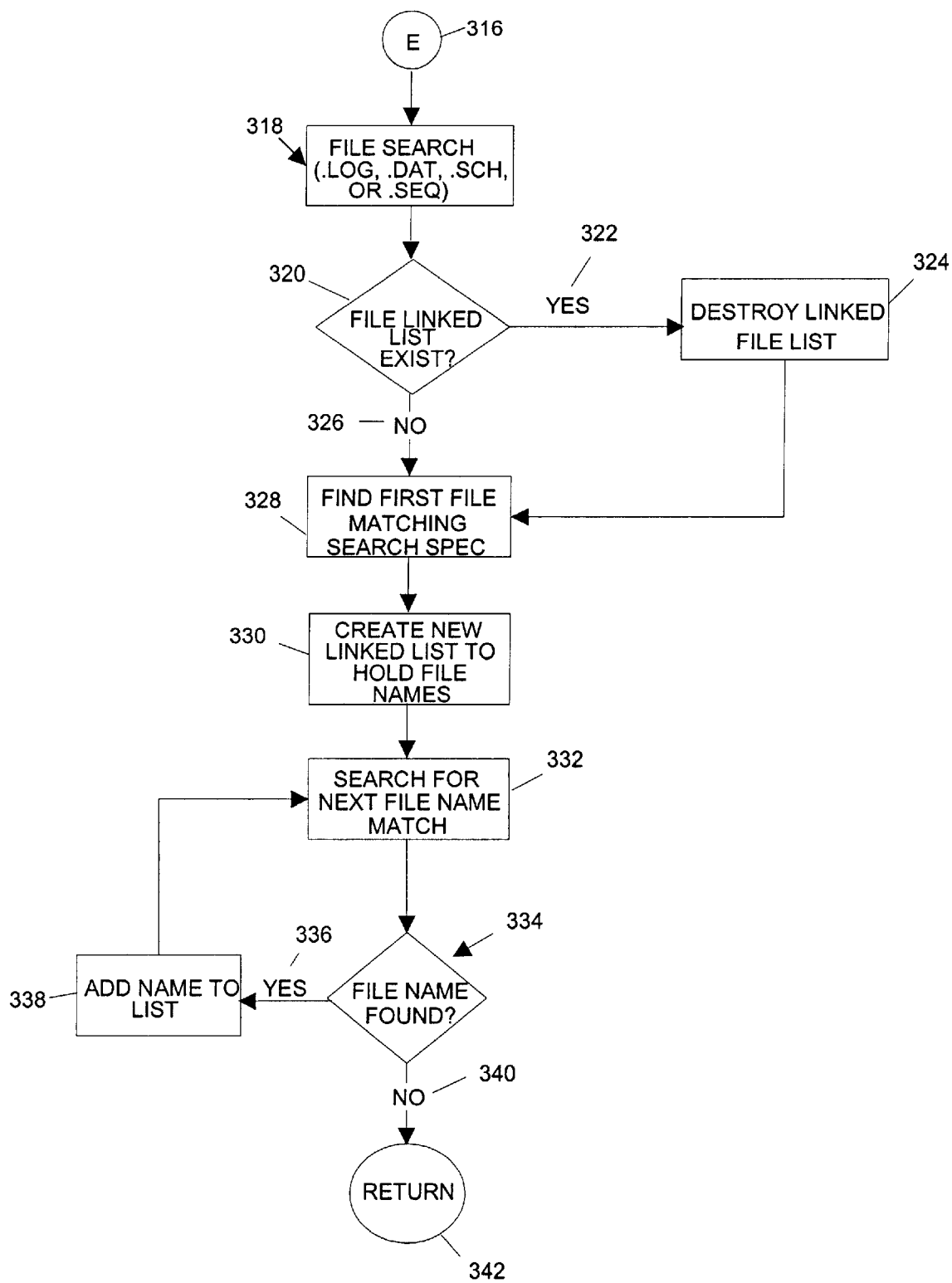

At this point the modem communications software enters into a routine at 316. Routine 316 is illustrated in FIG. 9 and includes executing a file search for the selected file type at 318. The modem communications software checks to see if a link file list with the file type exists at 320. If the answer is yes at 322, the linked file list is destroyed at 324 because the list might not be up to date. If there is no list at 326 there is no linked file list to destroy so the modem communications software finds the first file that matches the file type that has been selected at 328. Once found at 328, the modem communications software creates a new link list to all of the file names that match the search and adds the first file found to the list at 330. Upon completion of that action, the modem communications software searches for the next file that matches the selected file type at 332. At 334, the modem communications software searches for any more files that match the selected file type. If there are files at 336, the file name is added to the linked list at 338 and the search is conducted again at 332. If there are no more that matches selected type at 340, then the modem communications software returns to the location in the modem communications software where this routine was called at 342.

As illustrated in FIG. 8, once the software returns to the function at 316, the modem communications software refreshes the file open window with the current link list of file names that match the selected file at 344 and shows the mouse at 346. Once the mouse is shown, the modem communications software inquires as to whether the OK button has been pressed at 348 and if the button has been pressed at 350, then the modem communications software sets the screen to the file type selected at 352 and returns to the in the software where this routine was called at 354.

If the OK button was not pressed at 356, then the modem communications software inquires as to whether the cancel button has been pressed at 358. If the cancel button has been pressed at 359, then the modem communications software is returned to the position where this routine was called at 354. If the cancel button had not been pressed at 360, then the modem communications software repeats this loop until either the OK or the cancel button is pressed.

Figure 10:
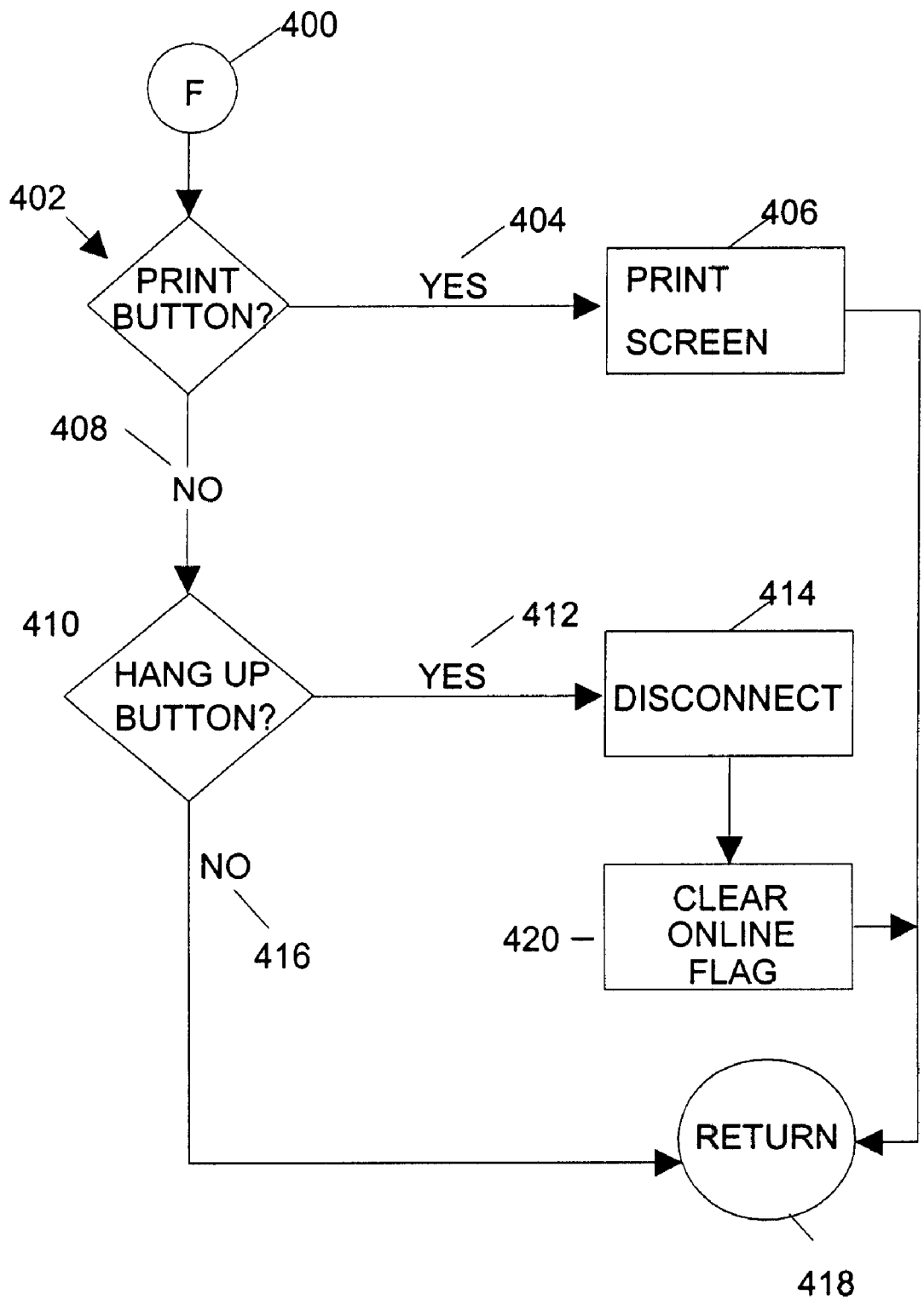

As illustrated in FIG. 10, if the initial routine 250 has been completed, then the modem communications software begins routine 400 by checking to see if the print button has been pressed at 402. If the print button has been pressed at 404, then the modem communications software prints the screen at 406. If the print button has not been pressed at 408, then the modem communications software checks to see if the hangup button has been pressed at 410. If the hangup button has been pressed at 412, the modem communications software disconnects at 414 from the modem and control board at the remote compressor location. After the disconnect is executed, the modem communications software will clear the online flag at 420. If the hangup button has not been pressed at 416, then the modem communications software returns to the location in the modem communications software where this routine was called at 418.

Figure 11:
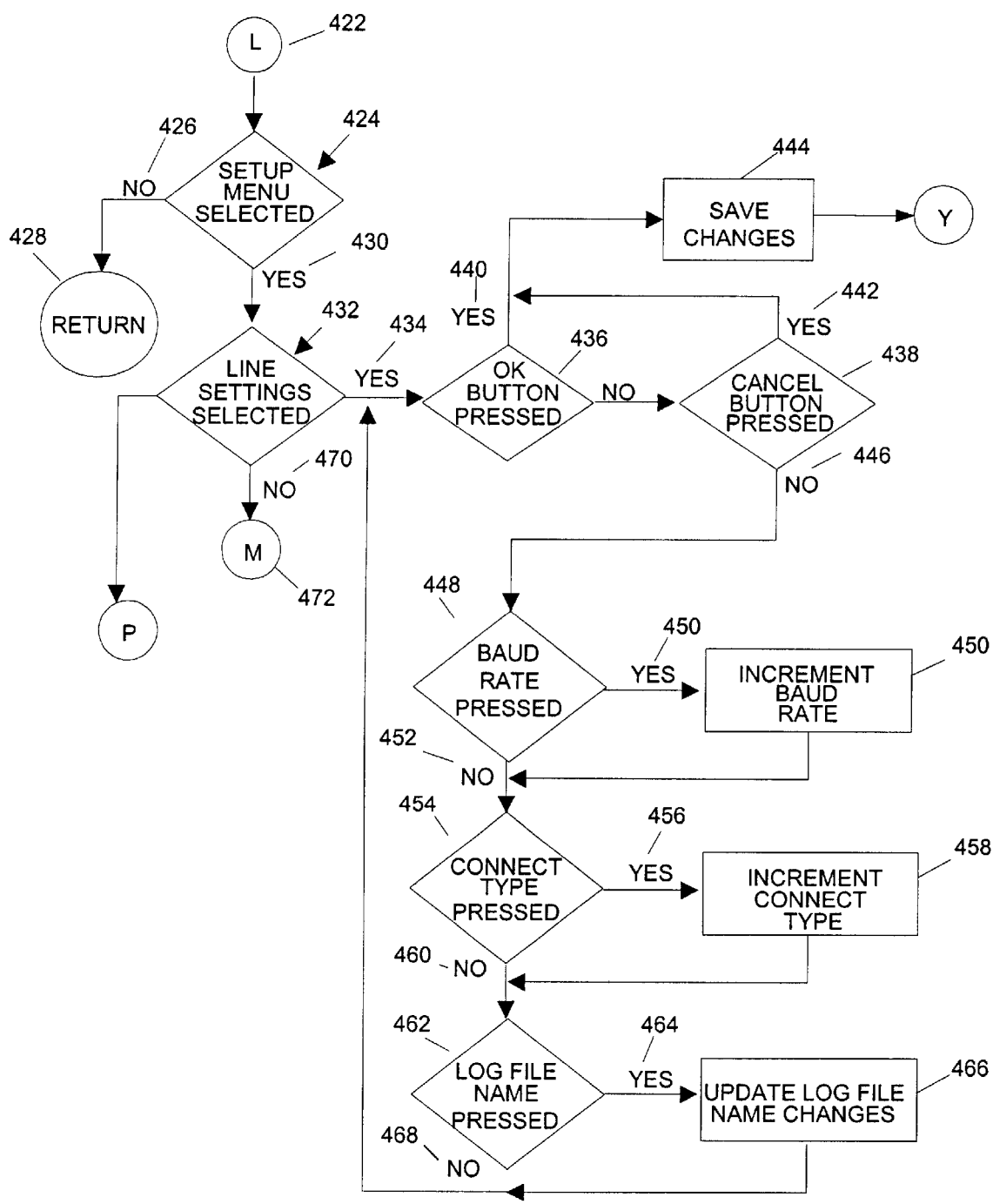

Referring now to FIGS. 6 and 11, the sub routine 422 is activated when the modem communications software checks to see if the setup menu has been selected at 424. If the set up menu has not been selected at. 426, then the modem communications software returns to a location in the modem communications software where this routine was called at 428.

If the set up menu has been selected at 430, the modem 20 communications software then checks to see if the line settings has been selected at 432. If the lines setting has been selected, at 434, then the modem communications software inquires as to whether the OK button has been pressed at 436 or the cancel button has been pressed at 438. If either of these button has been pressed at 440 or 442, then the modem communications software saves any changes at 444 and proceeds to screen one (1) at the beginning of the main loop 130.

If neither of the buttons 436 or 438 has not been selected at 446, then the modem communications software checks as to whether the baud rate has been selected at 448. If the baud rate button has been selected, at 450, then the modem communications software increments the baud rate at 450. If the baud rate button has not been pressed at 452, then the modem communications software checks to see if the connect type button is pressed at 454. If the connect type button has been selected at 456, then the modem communications increments the connect type to either direct or remote at 458.

If the connect type button was not selected at 460, then the modem communications software looks to see if the log file button was selected at 462. If the log file name button was selected at 464, then the modem communications software will update the log file and name changes and enter them at 466. If none of the buttons 438, 448, 454 or 462 were selected, then this loop is repeated until a button has been selected at 468.

Figure 12:
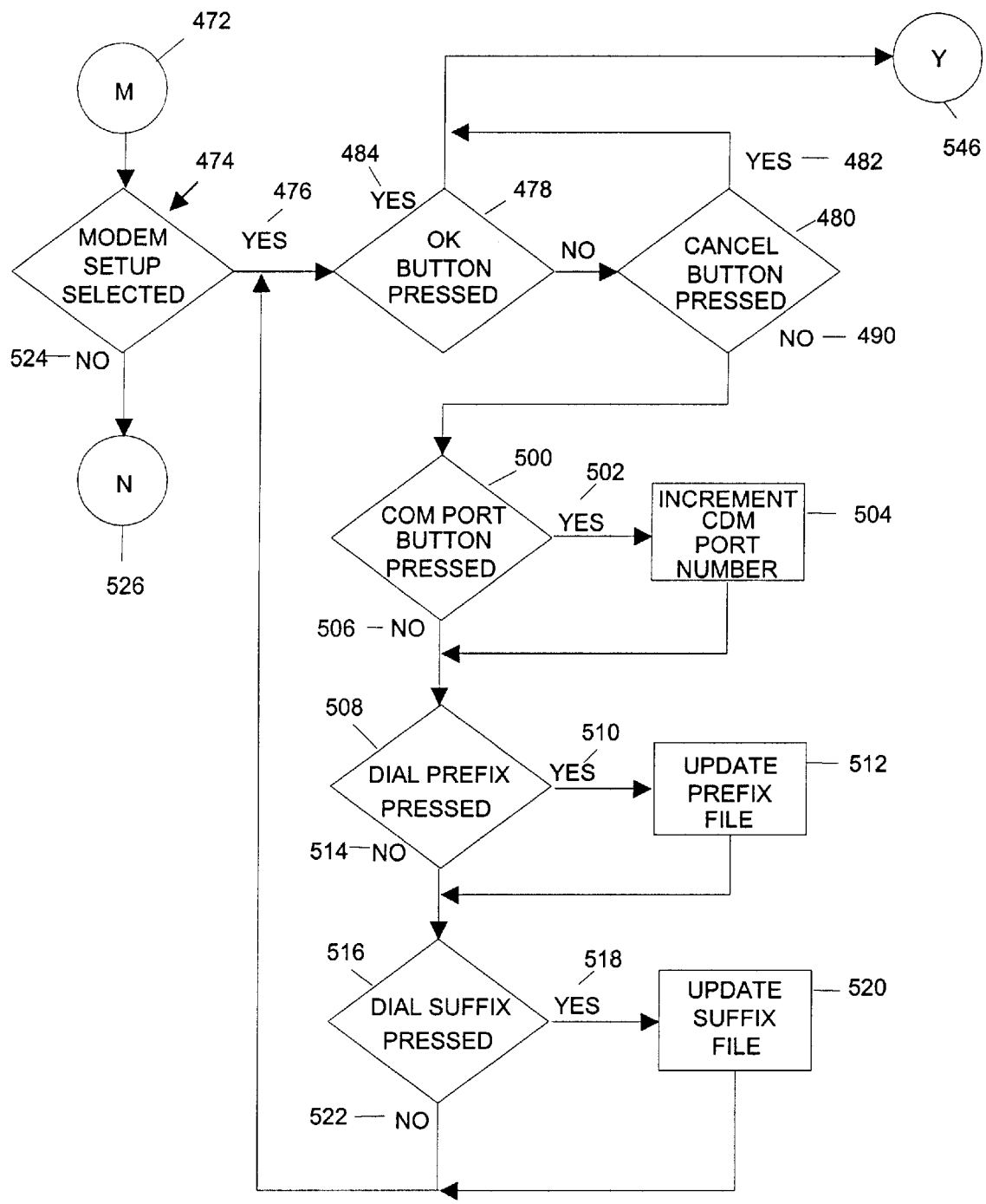

With reference now to FIGS. 11 and 12, in the event that the modem communications software receives a negative response at 470 to whether the line settings were selected at 432, then the modem communications software moves to routine 472. In routine 472, the modem communications software inquires as to whether the modem set up was selected at 474. If the modem set up was selected at 476, then the modem communications software inquires as to whether either the OK button at 478 or the cancel button at 480 has been pressed. If either of these buttons 478 or 480 has been pressed at 482 or 484, then the modem communications software goes to screen one (1) at the beginning of the main loop 130 in FIG. 3. If these buttons have not been pressed at 490, then the modem communications software inquires as to whether the corn port has been selected at 500. If the corn port button has been selected at 502, then the modem communications software increments the corn port number at 504. If the corn port button has not been selected at 506, then the modem communications software checks as to whether the dial prefix button has been selected at 508. If the dial prefix button has been selected at 510, then the modem communications software will update the prefix file at 512.

If the dial prefix button was not selected at 514, then the modem communications software inquires as to whether the dial suffix button was selected at 516. If the dial suffix button was selected at 518, then the modem communications software will update the suffix file at 520. If the dial suffix button was not selected at 522, then the routine returns to the modem set up selected button at 474. If the modem set up button was not selected at 524, then the modem communications software begins routine 526, as illustrated in FIG. 13.

At 526, the modem communications software checks to see if the phone list is selected at 528. If not at 530, the loop is repeated until a button is pressed that will allow this routine to return to the place where it was called.

If the phone list is selected at 532, then the modem communications software will look to see if the connect button has been pressed at 534. If the connect button has been pressed at 536, then the modem communications software will proceed to the connect route at 538.

Figure 13:
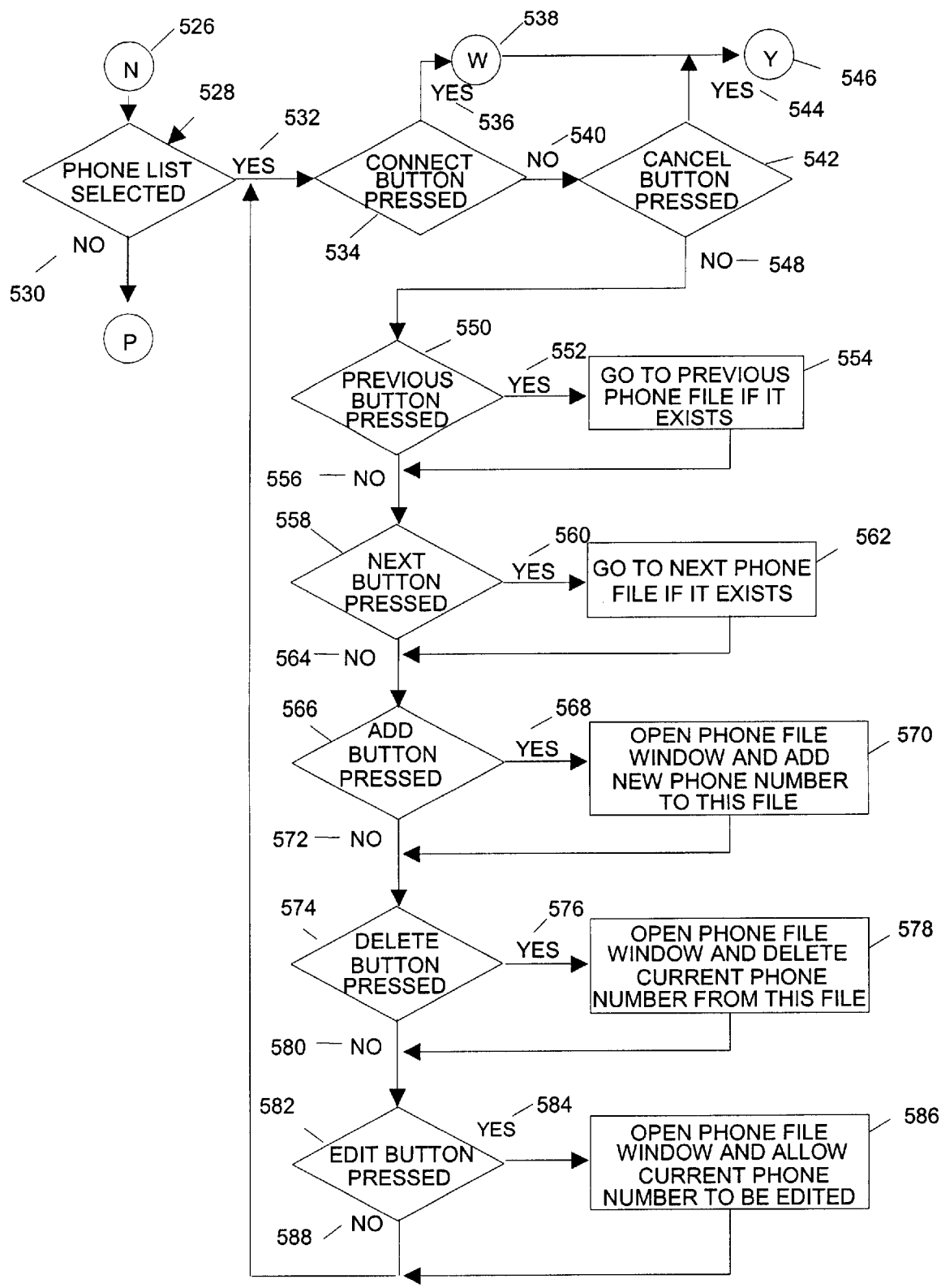

If the connect button is not pressed at 540, and the cancel button 542 has been pressed at 544, then the modem communications software will proceed to the go to screen one (1) at the beginning of the main loop at 546 in both FIGS. 3 and 13. If neither the connect button or the cancel button has been pressed at 548, then the modem communications software searches to determine whether the previous button has been selected at 550.

Figure 14:
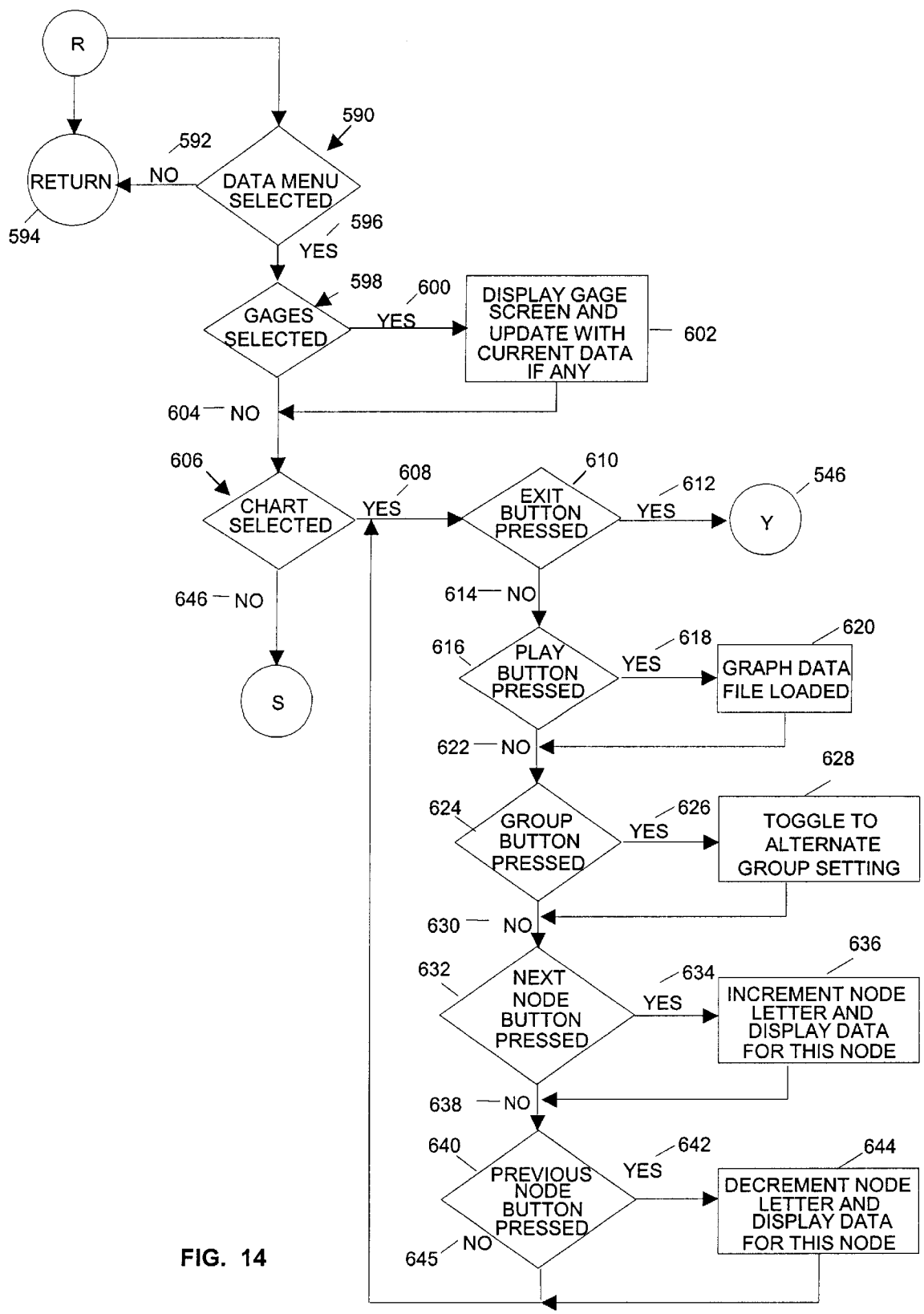

If the previous button pressed has been selected at 552, the modem communications software then decrements to the previous phone number if a previous phone number exists at 554. If the previous button is not selected at 556, then the modem communications software checks as to whether the next button has been selected at 558. If the next button has been selected at 560, then the modem communications software increments to the next phone number if the next phone number exists at 562. If the button at 558 has not been selected at 564, then the modem communications software checks as to determine whether the add button has been selected at 566. If the add button has been selected at 568, then the modem communications software will open. the phone file window and add the new phone number to this file at 570. If the add button was not selected at 572, then the modem communications software inquires as to whether the delete button was selected at 574. If the delete button was selected at 576, the modem communications software opens the phone file window and deletes the current phone number from this file at 578. If the delete button was not selected at 580, the modem communications software inquires as whether the edit button was selected at 582. If the edit button was selected at 584, then the modem communications software opens the phone file window and allows the current phone number to be edited at 586. If the edit button was not selected at 588, then the program repeats the loop until a button is pushed As illustrated in FIG. 14, the modem communication software inquires as to whether the data menu has been selected at 590. If the data menu has not been selected at 592, then the modem communication software returns to the point where this routine was called at 594.

If the data menu has been selected at 596, then the modem communications software checks to see if the gauges has been selected at 598. If the gauges menu has been selected at 600, then the modem communications software displays the gauge screen and updates the current data, if any, at 602. If the gauge screen was not selected at 604, then the modem communications software inquires as to whether the chart screen was selected at 606. If the chart screen was selected at 608, then the modem communications software checks to see if the exit button has been selected at 610.

If the exit button has been selected at 612, then the modem communications software returns to the entry of the main loop on Figure three and goes to screen one at the beginning of the main loop or 130. If the exit button has not been selected at 614, then the modem communications software inquires as to whether the play button has been selected at 616. If the play button has been selected at 618, then the modem communications software loads the graph data file at 620. If the play button was not selected at 622, the modem communications software inquires as to whether the group button was pressed at 624.

If the group button has been selected at 626, the modems communications software toggles to the alternate group setting at 628. If the group button has not been selected at 630, then the modem communications software inquires as to whether the next node button was selected at 632. If the next mode button was selected at 634, then the modem communications software decrements the node letter and displays data for the node at 636. If the next node button was not selected at 638, the modem communications software inquires if the previous node button had been selected at 640. If the previous node button had been selected at 642, the modem communications software increment one node letter and display some data for this node at 644.

Figure 15:
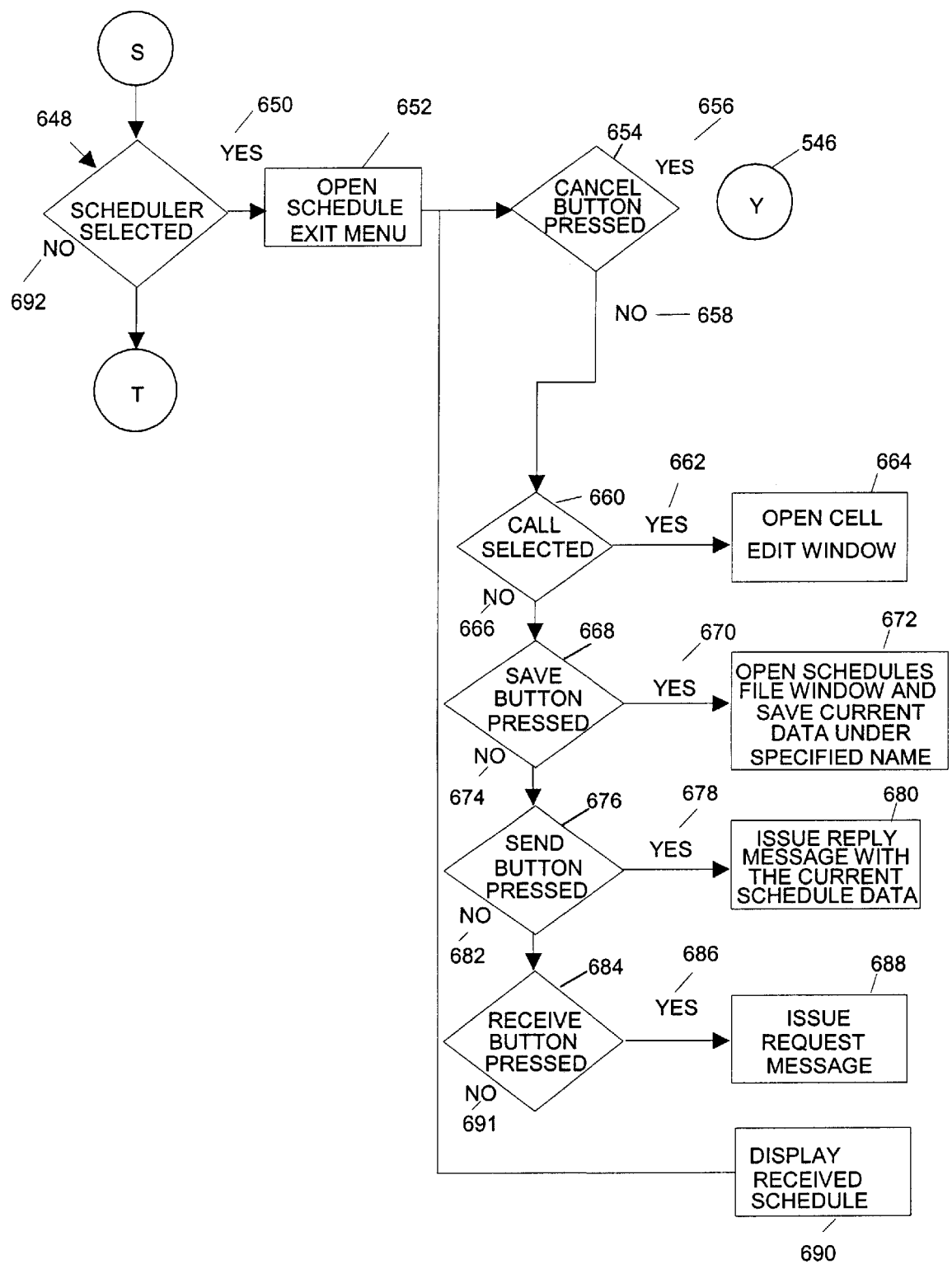

If the previous node button was not selected 645, the modem communications software remains in the loop until either a node button is selected or the exit button is selected to exit the chart window. If the exit button is pressed at 612, then the modem communications software goes to 546. If the chart screen 606 was not selected at 646, then the modem communications software inquires as to whether the scheduler screen had been selected at 648 as shown in FIG. 15. If the scheduler screen has been selected at 650, then the modem communication software opens the schedule edit menu at 652. If the cancel button 654 has been pressed at 656, then the modem communications software returns the program to the main loop 130 in FIG. 3 at 546.

If the cancel button has not been pressed at 658, then the modem communication software checks to see if the cell has been selected in the scheduler screen at 660. If the cell has been selected at 662, then the modem communications software will open the cell edit window and save any changes to the copy of the schedule in the edit screen at 664. If the cell was not selected in the scheduler screen at 666, the modem communications software will check to see if the save button had been pressed at 668. If the save button had been pressed at 670, then the modem communications software will open the schedule file window and save the current schedule under the name specified at 672. If the save button was not pressed at 674, then the modem communications software will check to see if the send button was pressed at 676. If the send button was pressed at 678, then the modem communications software will issue a schedule reply message containing the current schedule data at 680. The reply message will overwrite any data in data file in the control board memory.

If the send button has not been pressed at 782, then the modem communications software will inquire as to whether the receive button has been pressed at 684. If the receive button has been pressed at 686, then the modem communications software will issue a request for schedule message from the schedule data at 688 and then display the message on the screen at the remote PC at 690. If the receive button is not pressed, the program remains in the loop until a button is pressed.

Figure 16:
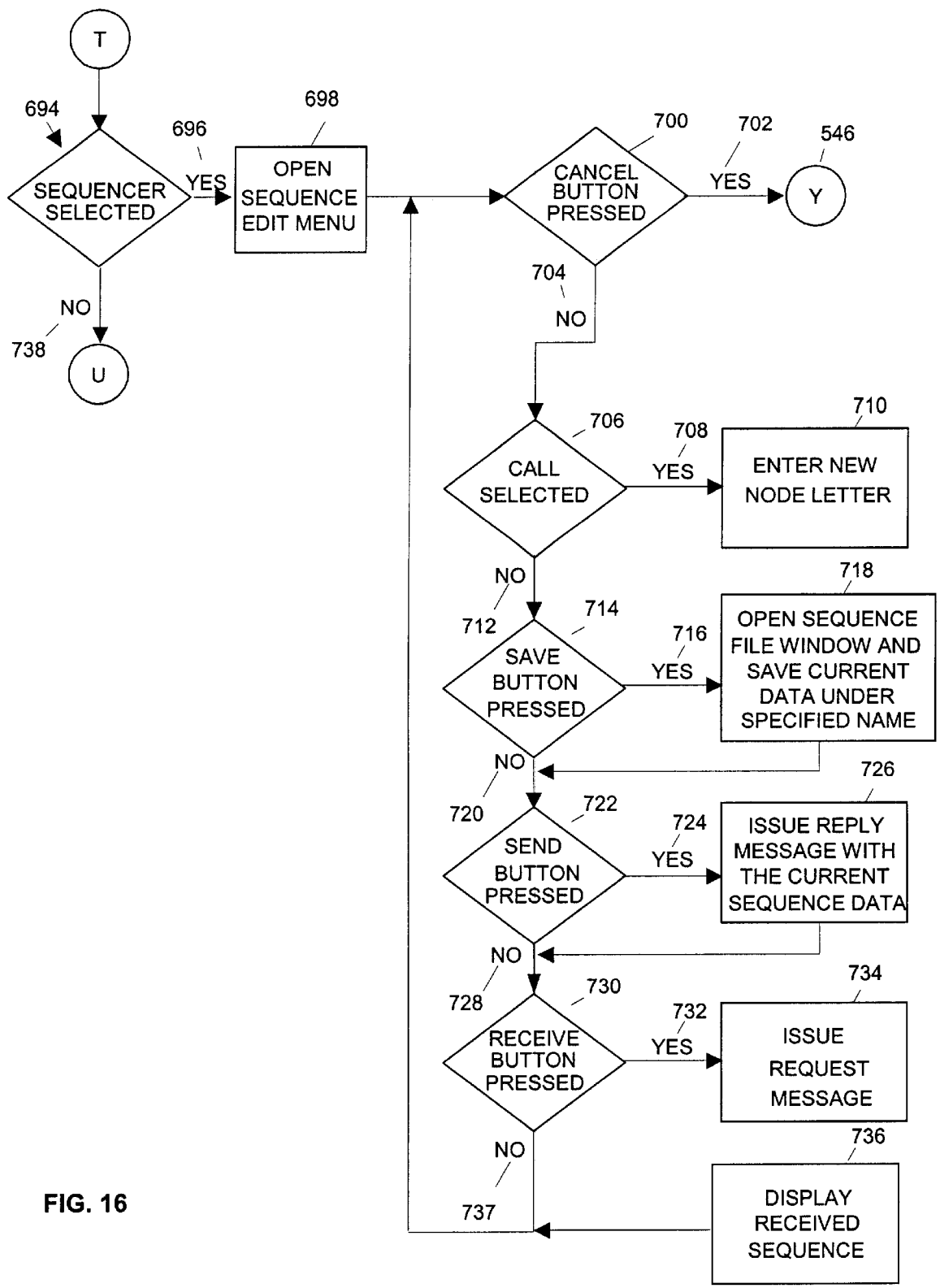

If the scheduler was not selected at 692, then the modem communications software will inquire whether the sequencer has been selected at 694, as shown in FIG. 16. If the sequencer has been selected at 696, then the modem communications software will open the sequence edit menu at 698. If the cancel button 700 has been pressed at 702, then the modem communications software will return to the main loop 130 in FIG. 3 at 546.

If the cancel button has not been pressed at 704, the modem communications software will check to see if a cell has been selected in the sequencer screen at 706. If the cell in sequencer menu has been selected at 708, then the modem communications software will overwrite the node number in the cell by just typing in the new node letter at 710. If the cell was not selected in the sequencer menu at 712, the modem communications software will check to see if the save button 714 has been pressed. If the save button 714 has been pressed at 716, then the modem communications software will open the sequence file window and save the current data under the specified name at 718.

If the safe button was not selected at 720, then the modem communications software will check to see if the send button was pressed at 722. If the send button 722 was pressed at 724, then the modem communications software will issue a reply message with the current sequence data. The reply message will overwrite the data in the compressor control board memory at 726.

If the send button was not selected at 728, the modem communications software will check to see if the receive button was selected at 730. If the receive button was selected at 732, the modem communications software will issue a request message for the sequence data at 734. When the data is received the modem communications software will display the received data in the PC screen at the remote location at 736. If none of the buttons are pressed at 737, then the modem communications software remains in the loop until the cancel button is pressed at 702

Figure 17:
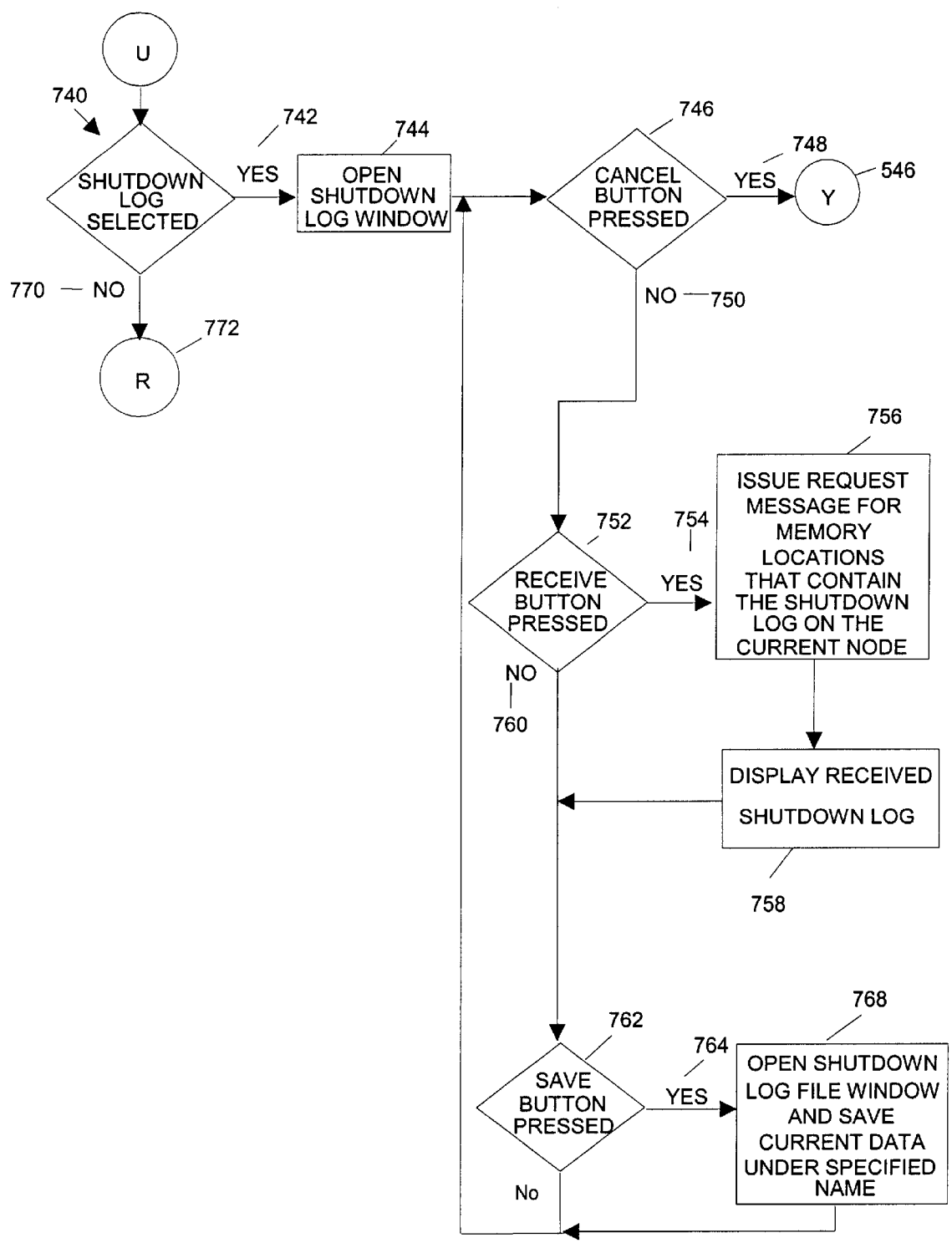

If the sequencer was not selected at 738, then the modem communications software will check to see if the shut down log screen has been selected at 740, as illustrated in FIG. 17. If the log screen was selected at 742, the modem communication software will open the shutdown log screen and display any shut down log data that may have been selected from the file menus at 744. If the cancel button 746 had been pressed at 748, then the modem communications software will return to the main loop 130 at 546 in FIG. 3. If the cancel button had not been pressed at 750, the modem communication software inquires as to whether the receive button had been pressed at 752. If the receive button had been repressed at 754, then the modem communications software will issue all the required request messages from the memory locations in the compressor control board, that contain the shut down log information at 756 and displays them at 758.

If the receive button has not been pressed at 760, then the modem communications software will check to see if the save button has been pressed at 762. If the save button has been pressed at 764, the modem communications software opens the shut log file window and saves current data under specified name at 768. If the shut down log screen was not selected at 770, then the modem communications software repeats the loop until a button is pressed that will allow this routine to return to the place where it was called at 772.

Figure 18:
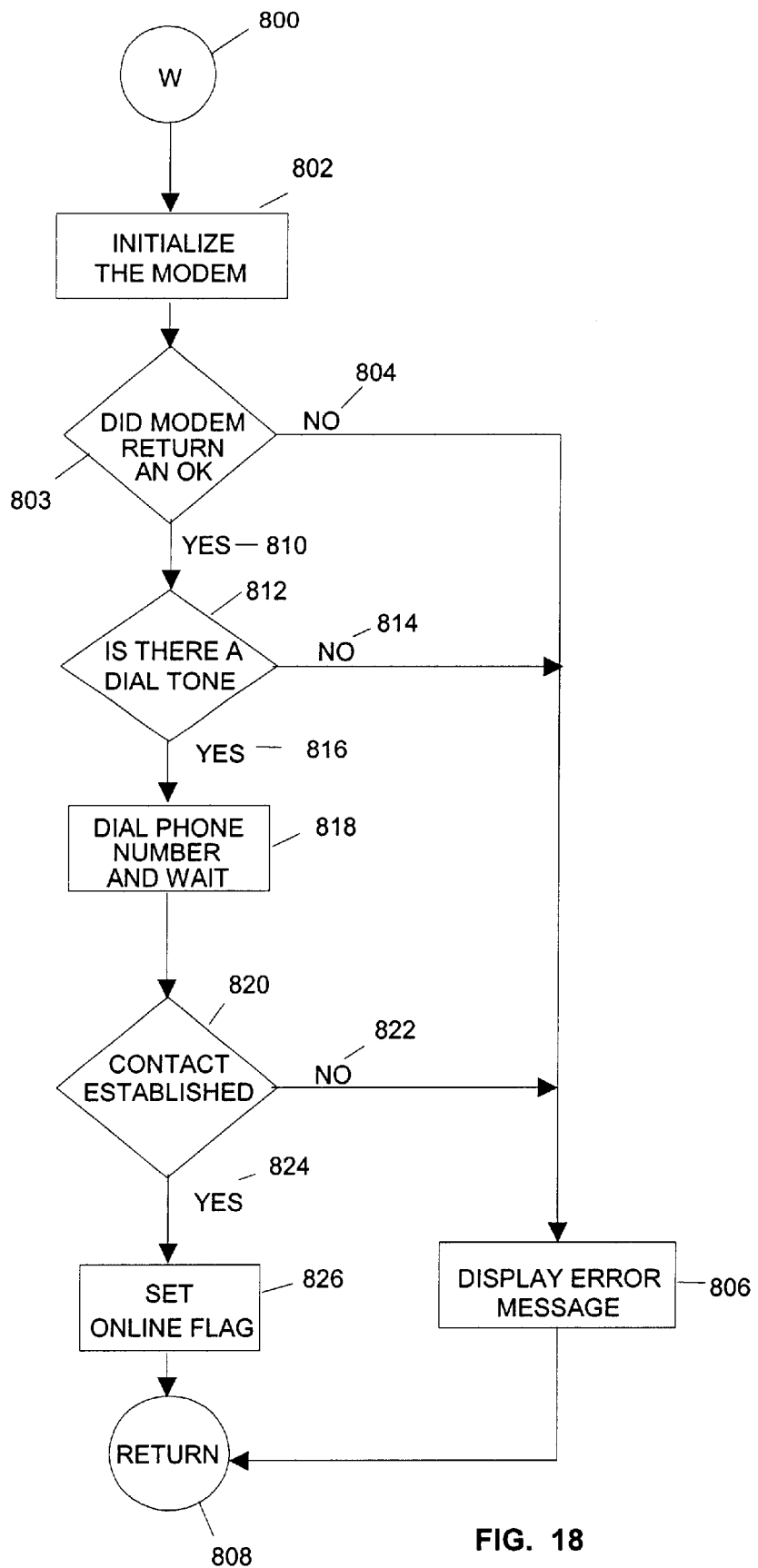

As shown in FIG. 18, if the connect button was pressed under the setup menu phone list selection, then the modem communications software would have jumped to 800. At this point the modem communication software would initialize the modem at 802 and check to see that the modem received the initializing code and returns an OK at 803. If the modem did not respond at 804, then an error message would be placed on the screen at 806 and this routine returns to where it was called at 808. If the modem did respond correctly at 810, the modem communications software checks to see if there is a dial tone at 812. If there is no dial tone at 814, then there is something wrong with the phone line and this routine returns to where it was called and an error message is displayed at 806. If there is a dial tone at 816, then the modem communications software dials a selected phone number at 818, and this routine goes into a time out period to give the modem at the other end time to answer the phone. If the modem at the other end does not answer or if the modem cannot establish contact 820, at 822, then this routine returns to where it was called and the error message is displayed at 806. If contact is established at 824, then the modem communications software establishes an on-line flag at 826, and the routine returns to where it was called at 808.

Returning now to FIG. 6, the modem communications software checks to see if the user has terminated the program at 900. If the user has terminated the program at 902, then the modem communication program disables all events at 904. At 906, the modem communications software checks to see if the modem is still on line at 908. If the modem is on line at 910, then the modem communications software hangs up and resets all flags at 912 and returns to the location of the modem communications software where this routine was called at 916. If the modem was not on line at 914, then the modem communications software returns to the location of the modem communications software where this routine was called at 916.

While the systems and methods described herein constitute preferred embodiments of the invention, it is to be understood that the invention is not limited to these precise systems and methods and that changes may be made therein without departing from the scope of the invention which is defined in the appended claims.

What is claimed is:

1. A system for remotely controlling at least one machine, the system comprising:
    at least one computer having a modem communications software computer program operatively programmed therein;
    at least a first modem operatively connected to the computer;
    at least one machine having at least one control board operatively connected thereto, the computer being located at a site remote from the at least one machine, the at least one machine being a compressor and the at least one computer can access a shutdown log for a single machine or any one of a plurality of machines in a network of machines, display the shutdown history of the machine, save the shutdown history to a file, or print the shutdown history at the remote location;
    at least a second modem operatively connected to the control board for communication with the at least first modem; and
    communication means, operatively connecting the at least first and the at least second modems, for transferring data in both directions between the at least one control board and the at least one computer.

2. The system of claim 1 further comprising:
    a plurality of machines, each machine having a control board operatively connected thereto; and
    network means for operatively connecting the plurality of machines together.

3. The system of claim 2 wherein the each control board includes:
    means, operatively connected to the network means, for communicating with each of the machine control boards.

4. The system of claim 3 wherein each control board continuously maintains and exchanges operating status information with each of the other control boards operatively connected to the network; and
    each control board maintains full operating status information for each of the other control boards operatively connected to the network.

5. The system of claim 2 wherein status information of all networked machines is transmitted to a remotely located station for real-time monitoring and control purposes.

6. The system of claim 2 wherein, as demand increases, a startup sequence for the connected machines is transmitted to at least one of the networked machine control boards and the startup sequence is transmitted to the other machines in the network.

7. The system of claim 2 wherein the plurality of machines are sequentially scheduled by an operator at the remote location such that the sequence assigned to a particular time will assure that the machines operating at that time will be operating as close to full load as possible.

8. The system of claim 1 further comprising:
    at least one security means, operatively connected to the computer, for preventing unauthorized installation or use of the modem communications software installed on a computer.

9. The system of claim 8 wherein the at least one security means comprises:
    a software locking key.

10. The system of claim 9 wherein the software locking key is a hardware device that is operatively connected to a printer port positioned on the computer.

11. The system of claim 8 wherein the at least one security means comprises:
    the serial number of at least one of the machines being embedded within the modem communications software delivered to an end user.

12. The system of claim 11 wherein, when the modem communications software running on the computer establishes communications with at least one machine at the remote location, the modem communications software requests at least one serial number of at least one of the machines.

13. The system of claim 12 wherein, if at least one of the serial numbers cannot be obtained, the modem communications software immediately breaks the electronic connection with the modem at the remote location.

14. The system of claim 12 wherein, if at least one of the serial numbers received do not match one of the authorized serial numbers embedded in the modem communications software, the modem communications software immediately breaks the electronic connection with the modem at the remote location.

15. The system of claim 2 wherein, with the modem communications software, an operator can monitor each machine having a control board in the network of machines via the at least second modem operatively connected to one control board operatively connected to at least one of the machines in the network.

16. The system of claim 15 wherein, with the modem communications software, an operator can monitor up to sixteen (16) machines in a single network.

17. The system of claim 1 wherein, with the modem communications software is capable of retrieving all of the information available in the at least one control board.

18. The system of claim 17 wherein the information available comprises:
    Loaded running hours, Unloaded running hours, Air filter hours, Fluid filter hours, and Separator element hours.

19. The system of claim 17 wherein the information available comprises:
    the condition of the Air filter, the condition of the Fluid filter, and the condition of the Separator element.

20. The system of claim 2 wherein, with the modem communications software installed on the computer at the remote location, includes:
    means for modifying the sequence and schedule information of the networked machines.

21. The system of claim 20 wherein the modifying means further comprises:
   means for retrieving the sequence and schedule information from any machine in the network;
   means for saving or modifying the sequence and schedule information; and
   means for transmitting the sequence and schedule information back to the network of machines through the at least first modem and the at least second modem to the control board connected thereto.

22. The system of claim 21 wherein, using the modem communications software, machines in a network can be selectively unloaded and shut down by setting up a sequence that does not include that specific machine and scheduling the newly scheduled sequence for a day and time of the week that such shutdown of the machine is desired.

23. The system of claim 22 wherein, when that scheduled day and time is reached, any machines that are not included in the instruction sequence are shut down and are not allowed to run until they are included in a sequence that is scheduled at a later time.

24. The system of claim 23 wherein, such remote scheduling allows selectively off loading machines when there is no demand for the selected machines, or during high electrical peak demand periods when there might be a billing penalty if a machine that is not needed might start because of fluctuating facility air pressures.

25. The system of claim 2 wherein all of the operating parameters of each of the plurality of machines can be remotely modified by commands initiated by the modem communications software and communicated to each of the plurality of machines through the at least first and the at least second modems.

26. The system of claim 25 wherein the modifications comprise:
   the machine load and unload pressure settings, the Auto-Dual timer setting, the target pressure setting, the time and date settings, the mode of operation and/or the number of lift valves that are open or closed.

27. The system of claim 1 wherein the modem communications software further comprises:
   alarm means, operatively positioned at the remote location, for notifying an operator if the machine should shut down other than for a scheduled shutdown.

28. The system of claim 27 wherein the alarm means provides a description of the cause of the unscheduled shutdown at the remote location.

29. The system of claim 2 wherein the modem communications software further comprises:
   means for analyzing the data collected from each machine to establish a usage trend.

30. The system of claim 29 wherein the usage trend is utilized for automatically establishing and settingup a network of machines such that appropriate sequences and schedules are generated at the remote site and transmitted back to the network of machines.

31. The system of claim 1 wherein the monitoring and recording means comprises:
   means for efficiently utilizing the machines energy such that energy consumption is reduced.

32. A method for remotely controlling at least one machine, the method comprising the steps of:
   providing at least one computer having a modem communications software computer program operatively programmed thereon;
   operatively connecting at least a first modem to the computer;
   providing at least one machine having at least one control board operatively connected thereto, the machine being located remote from the computer, the at least one machine being a compressor and the at least one computer can access a shutdown log for a single machine or any one of a plurality of machines in a network of machines, display the shutdown history of the machine, save the shutdown history to a file, or print the shutdown history at the remote location;
   operatively connecting at least a second modem to the control board; and
   operatively connecting the at least first and the at least second modems such that data is transferred between the at least one control board and the at least one computer in both directions.

33. The method of claim 32 further comprising the steps of:
   providing a plurality of machines, each machine having a control board operatively connected thereto; and
   providing network means for operatively connecting the control boards of the plurality of machines together.

34. The method of claim 33 further comprising the step of:
   communicating with each of the control boards operatively connected to the network means.

35. The method of claim 32 wherein each operatively connected control board continuously maintains and exchanges operating status information with the all the other of the plurality of machine control boards on the network; and
   each control board maintains full operating status information on all of the other control boards in the network.

36. The method of claim 33 further comprising the step of:
   transmitting status information of all networked machines to the remotely located computer for real-time monitoring and control purposes.

37. The method of claim 33 further comprising the step of:
   sequentially scheduling, at the remote location, such that the sequence assigned to a particular time will assure that the machines operating at that time will be operating as close to full load as possible.

38. The method of claim 32 further comprising the step of:
   operatively connecting at least one security means, to the computer for preventing unauthorized installation or use of the modem communications software installed on the computer.

39. The method of claim 38 further comprising the step of:
   operatively connecting a software locking key to a printer port on the computer.

40. The method of claim 38 further comprising the step of:
   embedding the serial number of the at least one machine within the modem communications software delivered to an end user.

41. The method of claim 40 further comprising the step of:
   after establishing communications with the at least one machine, requesting at least one serial number from the control board operatively connected to the at least second modem.

42. The method of claim 33 further comprising the step of:
   monitoring each of the plurality of machines having a control board in the network of machines via the at least second modem operatively connected to at least one of the control boards operatively connected to at least one of the machines in the network.

43. The method of claim 32 further comprising the step of:
   retrieving all of the information available in the control board.

44. The method of claim 43 wherein the retrieving step comprises the steps of:
    retrieving Loaded running hours;
    retrieving Unloaded running hours;
    retrieving Air filter hours;
    all retrieving Fluid filter hours; and
    retrieving Separator element hours.

45. The method of claim 32 further comprising the steps of:
    accessing a shutdown log for a single machine or any machine in a network;
    displaying the shutdown history of the machine; and
    saving the history to a file, or printing the history at the computer location.

46. The method of claim 33 further comprising the step of:
    modifying the sequence and schedule information for the networked machines.

47. The method of claim 33 further comprising the steps of:
    retrieving the sequence and schedule information from any machine in the network;
    saving or modifying the sequence and schedules; and
    transmitting the sequence and schedules back to the network of machines through the at least first modem and the at least second modem to the control board operatively connected thereto.

48. The method of claim 32 further comprising the steps of:
    selectively unloading and shutting down the machines by setting up a sequence that does not include the specific machine; and
    scheduling the newly scheduled sequence for a day and time of the week that such shutdown of the machine is desired.

49. The method of claim 32 further comprising the steps of:
    remotely modifying all of the at least one machine operating parameters by commands initiated by the modem communications software on the computer; and
    communicating the modifications to the at least one machine through the at least first and the at least second modems.

50. The method of claim 49 further comprising the step of:
    if one of the at least one machines should shut down other than for a scheduled shutdown, activating an alarm at the computer location.

51. The method of claim 50 wherein the alarm activating step comprises the step of:
    providing a description of the cause of the unscheduled shutdown.

52. The method of claim 32 further comprising the steps of:
    analyzing the data transferred from the at least one control board to the at least one computer; and
    establishing a usage trend based thereon.

53. The method of claim 52 wherein the establishing step comprises:
    automatically establishing and settingup a network of machines;
    generating appropriate sequences and schedules at the computer site; and
    transmitting the sequences and schedules back to the machines.

54. The method of claim 32 further comprising the step of:
    monitoring and recording how much demand is placed on the at least one machine over time.

55. The method of claim 32 further comprising the step of:
    efficiently utilizing the machine's energy such that energy consumption is reduced.

56. A system for remotely controlling at least one machine, the system comprising:
    at least one computer having a modem communications software computer program operatively programmed therein;
    at least a first modem operatively connected to the computer;
    a plurality of machines, each machine having a control board operatively connected thereto, the computer being located at a site remote from the machines and each control board including means, operatively connected to the network means, for communicating with each of the other machine control boards, each control board being a peer of the other control boards so that each control board is a master control board;
    network means for operatively connecting the control boards of the plurality of machines together;
    at least a second modem operatively connected to at least one control board for communication with the at least first modem; and
    communications means, operatively connecting the at least first and the at least second modems, for transferring data in both directions between the at least one control board and the at least one computer.

57. The system of claim 56 wherein, each control board is a peer of each of the other control boards in the network, so that no control board serves as the master and failure in any of the plurality of machines will not prevent continued network operation.

* * * * *

UNITED STATES PATENT AND TRADEMARK OFFICE
CERTIFICATE OF CORRECTION

PATENT NO. : 6,529,590 B1
DATED : March 4, 2003
INVENTOR(S) : Steven D. Centers

It is certified that error appears in the above-identified patent and that said Letters Patent is hereby corrected as shown below:

Column 22,
Line 43, that portion reading "0x10, /* 5-Function Code */" should read -- 0x11, /* 5-Function Code */ --.

Column 24,
Line 36, that portion reading "0x00, /* 3 - LSB of bytecount */" should read -- 0x06, /* 3-LSB of bytecount */ --.

Column 34,
Line 66, that portion reading "teh control board to the list of authorized serial numbers" should read -- the control board to the list of authorized serial numbers --.

Signed and Sealed this

Twenty-eighth Day of October, 2003

JAMES E. ROGAN
*Director of the United States Patent and Trademark Office*